US012792127B2

(12) United States Patent
Jun et al.

(10) Patent No.: US 12,792,127 B2
(45) Date of Patent: Nov. 10, 2026

(54) STORAGE SYSTEM FOR SUPPLYING OPTIMIZED POWER FOR EACH OPERATION, ELECTRONIC DEVICE, AND OPERATING METHOD OF ELECTRONIC DEVICE

(71) Applicant: SAMSUNG ELECTRONICS CO., LTD., Suwon-si (KR)

(72) Inventors: Sanghun Jun, Suwon-si (KR); Sunghun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 19/029,528

(22) Filed: Jan. 17, 2025

(65) Prior Publication Data

US 2026/0039187 A1 Feb. 5, 2026

(30) Foreign Application Priority Data

Aug. 1, 2024 (KR) ........................ 10-2024-0102703

(51) Int. Cl.
*G06F 1/3234* (2019.01)
*G06F 3/06* (2006.01)
*H02M 1/00* (2006.01)
*H02M 1/088* (2006.01)

(52) U.S. Cl.
CPC .......... *G06F 1/3275* (2013.01); *G06F 3/0625* (2013.01); *H02M 1/0009* (2021.05); *H02M 1/0054* (2021.05); *H02M 1/088* (2013.01)

(58) Field of Classification Search
CPC .. G06F 1/3275; G06F 3/0625; H02M 1/0009; H02M 1/0054; H02M 1/088
USPC .................. 327/538, 540, 541; 365/226, 227
See application file for complete search history.

(56) References Cited

U.S. PATENT DOCUMENTS

| | | | | |
|---|---|---|---|---|
| 9,711,232 | B2 | 7/2017 | Choi et al. | |
| 9,846,613 | B2 | 12/2017 | Arslan et al. | |
| 10,372,373 | B1 | 8/2019 | Benisty et al. | |
| 11,029,859 | B2 | 6/2021 | Margetts et al. | |
| 11,126,249 | B1 * | 9/2021 | O'Brien | H04L 45/7453 |
| 11,768,531 | B2 | 9/2023 | Matta et al. | |
| 11,847,327 | B2 | 12/2023 | Palmer | |
| 2006/0259800 | A1 | 11/2006 | Maejima | |

(Continued)

OTHER PUBLICATIONS

Robert Keim, "Multiphase DC-DC Converter Pros and Cons" Mar. 19, 2023, total 6 pages.

(Continued)

*Primary Examiner* — William Hernandez
(74) *Attorney, Agent, or Firm* — Sughrue Mion, PLLC

(57) ABSTRACT

A electronic device includes a controller and a power supply. The controller stores a table including gate signal frequencies and numbers of power transistors for plural operations, and based on the table and an operation request to perform an operation, outputs a power control signal including one or both of gate signal frequency for the operation and a number of power transistors for the operation. The power supply includes plural power transistors that receive gate signals. The power supply, based on the power control signal, generates one or more gate signals input to one or more power transistor among the plural power transistors, and, based on turn-on of the one or more power transistors, generates a load supply voltage based on a system supply voltage.

20 Claims, 22 Drawing Sheets

(56) References Cited

U.S. PATENT DOCUMENTS

| | | | |
|---|---|---|---|
| 2010/0007300 | A1 | 1/2010 | Hein et al. |
| 2023/0009061 | A1 | 1/2023 | Shim et al. |
| 2024/0062836 | A1 | 2/2024 | Matsumoto |

OTHER PUBLICATIONS

Kim et al., "A PWMPFM Dual-Mode DC-DC Buck Converter with Load-Dependent Efficiency-Controllable Scheme for Multi-Purpose IoT Applications" Energies 2021,14,960, pp. (1-14).
Communication issued Sep. 11, 2025 by the European Patent Office in European Patent Application No. 25170559.6.

* cited by examiner

FIG. 3

FGOs

| OPERATION TYPE | FREQUENCY | A NUMBER OF POWER TRANSISTOR |
|---|---|---|
| ⋮ | ⋮ | ⋮ |
| SEQ READ (OP MODE 1) | F11 | N11 |
| RAN READ (OP MODE 2) | F12 | N12 |
| MIX OP (OP MODE 3) | F13 | N13 |
| RAN WRITE (OP MODE 4) | F14 | N14 |
| SEQ WRITE (OP MODE 5) | F15 | N15 |
| ⋮ | ⋮ | ⋮ |

FIG. 4

| | OPERATION TYPE | FREQUENCY | A NUMBER OF POWER TRANSISTOR |
|---|---|---|---|
| BGOs | ⋮ | ⋮ | ⋮ |
| | BKGRD NAND READ | F21 | N21 |
| | BKGRD NAND WRITE | F22 | N22 |
| | BKGRD NAND ERASE | F23 | N23 |
| | ⋮ | ⋮ | ⋮ |

STORAGE SYSTEM FOR SUPPLYING OPTIMIZED POWER FOR EACH OPERATION, ELECTRONIC DEVICE, AND OPERATING METHOD OF ELECTRONIC DEVICE

CROSS-REFERENCE TO RELATED APPLICATION

This application is based on and claims priority under 35 U.S.C. § 119 to Korean Patent Application No. 10-2024-0102703, filed on Aug. 1, 2024, in the Korean Intellectual Property Office, the disclosure of which being incorporated by reference herein in its entirety.

BACKGROUND

Devices, apparatuses, and methods consistent with the present disclosure relate to an electronic device and, more particularly, to a storage system for supplying optimized power for each operation, an electronic device, and an operating method of the electronic device.

Electronic devices may operate based on power supplied from the outside. For example, the electronic device may convert an external voltage supplied from the outside into an internal voltage required by internal components and then use the converted internal voltage. When the external voltage is converted to the internal voltage, power loss may occur due to voltage switching or an equivalent resistance. Therefore, power consumption may be reduced as the ratio of power of internal voltage with respect to power of external voltage, i.e. power efficiency, increases.

Different operations performed by the electronic device may require different amounts of power. Even for operations supplied with the same internal voltage, the relationship between load current and power efficiency may vary. Therefore, the load current at which maximum power efficiency occurs for a particular operation may also vary from operation to operation. Accordingly, there are techniques that optimize power efficiency based on an operation that consumes the largest amount of power, but these techniques have a limitation in that the power efficiency decreases in operations other than the operation that consumes the largest amount of power are performed.

SUMMARY

It is an aspect to provide a storage system, in which the frequency of a power supply and a number of power transistors in the power supply are set for each operation to provide optimized power, an electronic device, and an operating method of the electronic device.

According to an aspect of one or more embodiments, there is provided an electronic device comprising a controller configured to store a table comprising gate signal frequencies and numbers of power transistors for a plurality of operations, and based on the table and an operation request to perform an operation, output a power control signal comprising at least one of a gate signal frequency for the operation or a number of power transistors for the operation; and a power supply comprising a plurality of power transistors that receive a plurality of gate signals, the power supply configured to, based on the power control signal, generate at least one gate signal that is input to at least one power transistor among the plurality of power transistors, and, based on turn-on of the at least one power transistor, generate a load supply voltage based on a system supply voltage.

According to another aspect of one or more embodiments, there is provided an electronic device comprising a controller configured to receive an operation request to perform an operation, and output a power control signal indicating the operation in response to the operation request; and a power supply comprising a plurality of power transistors receiving a plurality of gate signals, the power supply configured to store a table comprising gate signal frequencies and numbers of power transistors for a plurality of operations, based on the power control signal and the table, generate at least one gate signal that is input to at least one power transistor among the plurality of power transistors, and based on turn-on of the at least one power transistor, generate a load supply voltage based on a system supply voltage.

According to yet another aspect of one or more embodiments, there is provided a storage system comprising a host configured to store a table comprising gate signal frequencies and numbers of power transistors for each of a plurality of operations, generate an operation request to perform an operation, generate one of a first power control signal indicating the operation and a second power control signal comprising a gate signal frequency and a number of power transistors for the operation indicated by the first power control signal, and generate a system supply voltage; and a storage device configured to store the table, receive the operation request, one of the first power control signal or the second power control signal, and the system supply voltage, based on the one of the first power control signal or the second power control signal, control turn-on operations of a plurality of power transistors, based on the plurality of power transistors that are turned on, convert the system supply voltage into a load supply voltage, and perform the operation.

According to still yet another aspect of one or more embodiments, there is provided a method of operating an electronic device, the method comprising generating target operation information indicating a target operation; setting a target gate signal frequency for the target operation of the target operation information and a target number of power transistors for the target operation of the target operation information, based on a table comprising a gate signal frequency and a number of power transistors for each operation; providing gate signals having the target gate signal frequency to the target number of power transistors among a plurality of power transistors in a power supply; and generating, based on turn-on of the target number of power transistors, a load supply voltage based on a system supply voltage.

BRIEF DESCRIPTION OF THE DRAWINGS

Various embodiments will be more clearly understood from the following detailed description taken in conjunction with the accompanying drawings, in which:

FIG. 3 is a diagram showing an example of a first table according to various embodiments;

FIG. 4 is a diagram showing an example of a second table according to various embodiments;

DETAILED DESCRIPTION

Figure 1:
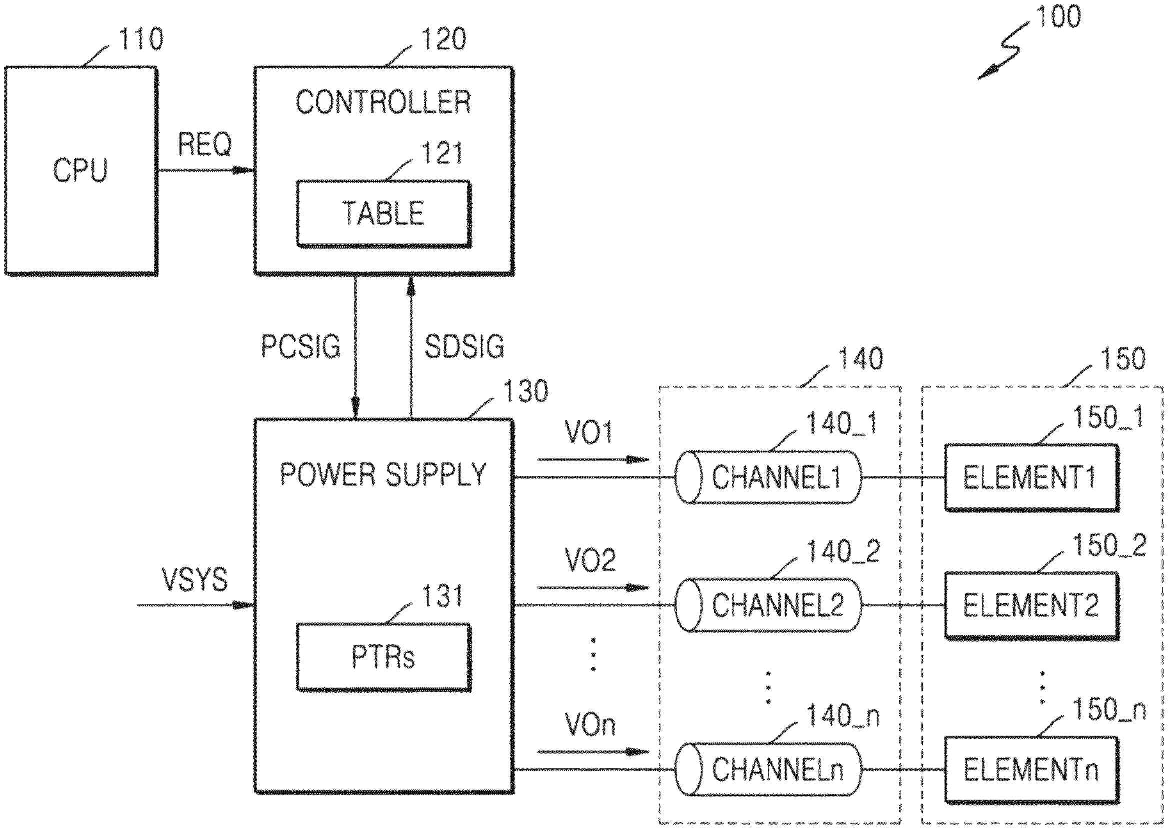
FIGS. 1 and 2 are block diagrams of electronic devices according to various embodiments.

As described above, electronic devices may operate based on power supplied from the outside. For example, the electronic device may convert an external voltage supplied from the outside into an internal voltage required by internal components and then use the converted internal voltage. In this regard, the electronic device may include a voltage supply for converting the external voltage into the internal voltage. For example, a power source supply for generating an internal voltage that is lower than an external voltage may be provided as a buck converter that performs a buck converting operation. When the external voltage is converted to the internal voltage, power loss may occur due to voltage switching or equivalent resistance inside the voltage supply. Therefore, power consumption may be reduced as the ratio of power of internal voltage with respect to power of external voltage, i.e. power efficiency, increases.

Since different operations performed by the electronic device may require different amounts of power, even for operations supplied with the same internal voltage, the relationship between load current and power efficiency may vary. Therefore, the load current at which maximum power efficiency occurs for a particular operation may also vary from operation to operation. Accordingly, there are related art techniques that optimize power efficiency based on an operation that consumes the largest amount of power, but these related techniques have disadvantages in that the power efficiency decreases in operations other than the operation that consumes the largest amount of power.

As discussed above, it is an aspect to provide a storage system, in which the frequency of a power supply and the number of power transistors in the power supply are set for each operation to provide optimized power, an electronic device, and an operating method of the electronic device Hereinafter, various embodiments are described in detail with reference to the accompanying drawings. As used in this specification, a phrase using the form "at least one of A, B, or C" includes within its scope "only A", "only B", "only C", "A and B", "A and C", "B and C" and "A, B, and C."

As used herein, the expressions "first," "second," and the like may modify various components, regardless of order and/or importance, and are only used to distinguish one component from other components and do not limit the components. For example, a "first" user device and a "second" user device may represent different user devices, regardless of order or importance. For example, a "first" component may be referred to as a "second" component, and similarly, a "second" component may be referred to as a "first" component, without departing from the scope of the present disclosure.

When a component (e.g., a first component) is described as being "operatively or communicatively coupled with/to" or "connected to" another component (e.g., a second component), it should be understood that the component can be directly coupled to another component or can be connected to another component through the other component (e.g., a third component). On the other hand, when a component (e.g., a first component) is described as being "directly coupled" or "directly connected" to another component (e.g., a second component), it should be understood that no other component (e.g., a third component) exists between the component and another component.

Figure 2:
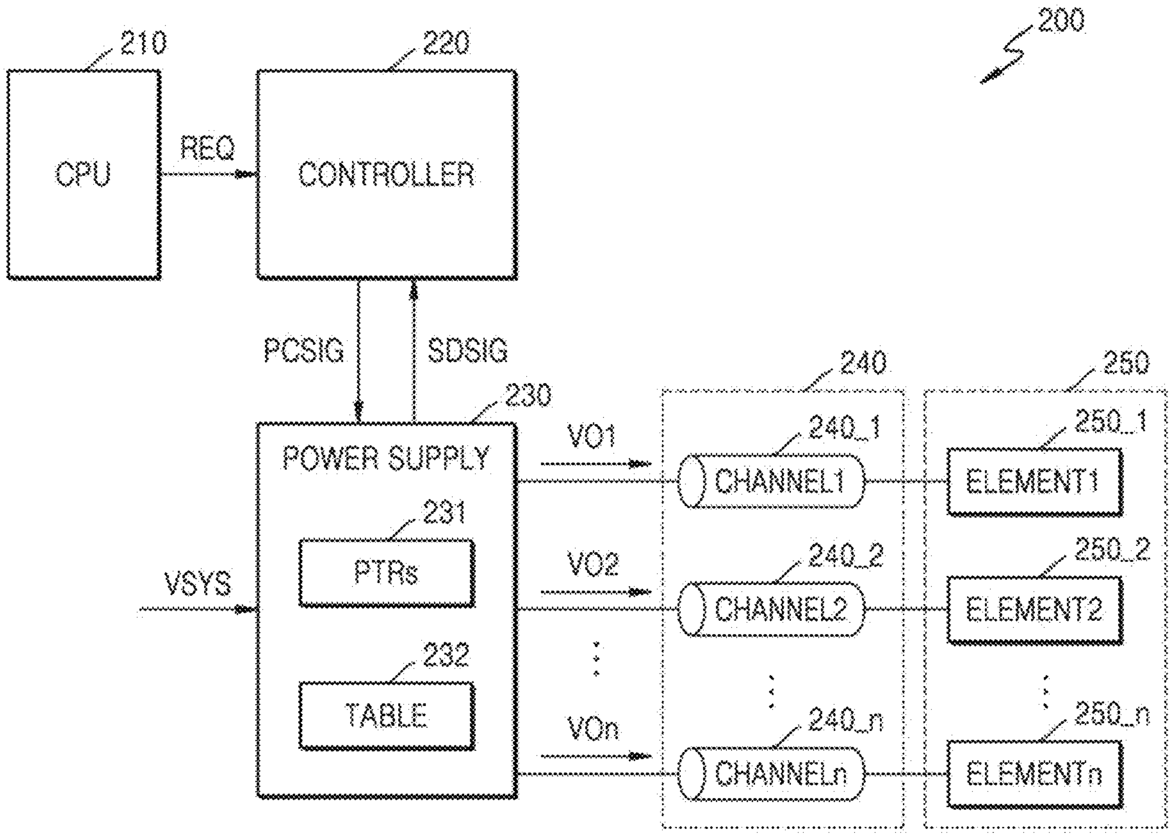

FIGS. 1 and 2 are block diagrams of electronic devices 100 and 200 according to various embodiments.

Referring to FIG. 1, the electronic device 100 may be provided in a smartphone, a tablet personal computer, a mobile phone, an e-book reader, a desktop personal computer, a laptop personal computer, a netbook computer, a personal digital assistant (PDA), a portable multimedia player (PMP), a MP3 player, a mobile medical device, a camera, a wearable device, or home appliance, etc.

The electronic device 100 may include a central processing unit (CPU) 110, a controller 120, a power supply 130, a plurality of channels 140, and a plurality of elements 150. The plurality of channels 140 may include a first channel 140_1, a second channel 140_2, . . . , to an nth channel 140_*n*. The plurality of elements 150 may include a first element 150_1, a second element 150_2, . . . , to an nth element 150_*n*.

The CPU 110 may control all operations of the electronic device 100. In embodiments, the CPU 110 may provide an operation request REQ to the controller 120. The operation request REQ may include an instruction requesting the controller 120 to perform an operation.

The controller 120 may receive the operation request REQ and perform an operation of the operation request REQ. In embodiments, the controller 120 may be configured to perform control logic of various devices, such as a baseboard management controller (BMC), a storage controller, and/or a memory controller.

In embodiments, the controller 120 may store a table 121. The table 121 may include frequencies and/or sizes of power transistors for each of the various operations that may be provided in the operation request REQ. In some embodiments, the various operations may include background operations performed in an idle state of the electronic device 100 and/or foreground operations performed in an active state of the electronic device 100. In some embodiments, the frequency in the table 121 may include an operating frequency of a gate signal generated by a power supply 130. In some embodiments, the size of the power transistor in the table 121 may represent a number of the power transistors to be activated among a plurality of power transistors (PTRs) 131 in the power supply 130. The activated power transistor (s) may represent a transistor capable of being turned on in response to a turn-on level of a gate signal. The deactivated power transistor(s) may represent a transistor that has been turned off.

The controller 120 may output a power control signal PCSIG on the basis of the table 121 and the operation request REQ. The power control signal PCSIG may include a signal for controlling a power supply operation of the power supply 130. In some embodiments, the power control signal PCSIG may include a frequency corresponding to the operation of the operation request REQ among the frequencies in the table 121. In some embodiments, the power control signal PCSIG may include the number of transistors (e.g., the number of power transistors to be activated) corresponding to the operation of the operation request REQ among the numbers of transistors in the table 121. In some embodiments, the power control signal PCSIG may include the frequency and the number of power transistors to be activated, corresponding to the operation of the operation request REQ, among the frequencies and the numbers of power transistors to be activated in the table 121.

In embodiments, the controller 120 and the power supply 130 may communicate with each other via an interface. For example, the interface may be provided in a variety of ways, for example interfaces that conform to Joint Electron Device Engineering Council (JEDEC) standards, such as an inter-integrated circuit (I2C), a double data rate (DDR4), a DDR5, a low power DDR (LPDDR4), and/or an LPDDR5, interfaces that conform to standards, such as non-volatile memory express (NVMe), NVMe management interface (MI), and/or NVMe over fabrics (NVMeof), and/or interfaces, such as advanced technology attachment (ATA), serial ATA (SATA), external SATA (e-SATA), a small computer small Interface (SCSI), a serial attached SCSI (SAS), peripheral component interconnection (PCI), PCI express (PCIe), NVMe, IEEE 1394, a universal serial bus (USB), a secure digital (SD) card, a multi-media card (MMC), eMMC, a universal flash storage (UFS), an embedded UFS (eUFS), and/or a compact flash (CF) card. However, embodiments are not limited to the examples described above. The controller 120 may transmit a command to the power supply 130 via the interface, and the power supply 130 may transmit a response to the command to the controller 120.

The power supply 130 may supply a plurality of load supply voltages VO1, VO2, . . . , and VOn to the plurality of elements 150 via the plurality of channels 140. In embodiments, the power supply 130 may convert (or switch) a system supply voltage VSYS supplied from a power source (e.g., a battery, an external power source, etc.) into the plurality of load supply voltages VO1, VO2, . . . , and VOn. In embodiments, the power supply 130 may include the plurality of power transistors (PTRs) 131, and the power supply 130 may switch the system supply voltage VSYS to the plurality of load supply voltages VO1, VO2, . . . , and VOn based on the turn-on of at least one power transistor among the plurality of power transistors 131. Each of the plurality of power transistors 131 of the power supply 130 may be turned on or off on the basis of a gate signal having a specific frequency.

In embodiments, when the power source is a battery in the electronic device 100, the system supply voltage VSYS may be referred to as an internal supply voltage of the electronic device 100. When the power source is an external power source of the electronic device 100, the system supply voltage VSYS may be referred to as an external supply voltage of the electronic device 100.

When the power supply 130 converts the system supply voltage VSYS into the plurality of load supply voltages VO1, VO2, . . . , and VOn, power loss according to the system supply voltage VSYS may occur due to conductor loss caused by the power transistors that are turned on. A power loss according to the system supply voltage VSYS may occur due to switching loss caused by the activated power transistors. Therefore, as the ratio of system power to external supply power, i.e., the power efficiency, is maintained at a high level, the efficiency of power consumption in the system increases.

In embodiments, the power supply 130 may receive the power control signal PCSIG from the controller 120 via the interface. The power supply 130 may generate at least one toggled gate signal on the basis of the frequency of the power control signal PCSIG and/or the number of power transistors to be activated. The toggled gate signal may include a signal that is input to a power transistor to be activated among the plurality of power transistors 131. The power supply 130 may generate the plurality of load supply voltages VO1, VO2, . . . , and VOn based on the system supply voltage VSYS, on the basis of the turn-on of at least one power transistor to be activated. The plurality of load supply voltages VO1, VO2, . . . , and VOn may be supplied to the plurality of elements 150. The voltage levels of the plurality of load supply voltages VO1, VO2, . . . , and VOn may be determined according to the operation of the operation request REQ (i.e., the type of operation) and/or according to the element connected to the corresponding channel. The power supply 130 may transmit a set-done signal SDSIG to the controller 120 via an interface. The set-done signal SDSIG is a response signal or ACK (e.g., ACK is an abbreviation for acknowledgement) to the power control signal PCSIG.

In embodiments, the power supply 130 and the plurality of elements 150 may be connected to each other via the plurality of channels 140. The number of plurality of channels 140 may be n. The number n may be a natural number greater than or equal to 2. In some embodiments, one element 150 may be connected to one channel. That is, in some embodiments, the plurality of channels 140 and the plurality of elements 150 may be provided in a one-to-one relationship.

The plurality of elements 150 may include functional units that receive load supply voltages to perform various functions in the electronic device 100. The plurality of elements 150 may receive different load supply voltages. In some embodiments, the plurality of elements 150 may include the CPU 110, the controller 120, a memory, etc. Some elements among the plurality of elements 150 may be provided in the same hardware. For example, first and second elements 150_1 and 150_2 may be in the controller 120, and the nth element **150_*n*** may be in the memory (e.g., flash memory, etc.). However, embodiments are not limited to the examples described above.

Referring to FIG. 2, similar to the electronic device 100, an electronic device 200 may include a CPU 210, a controller 220, a power supply 230, a plurality of channels 240, and a plurality of elements 250. The plurality of channels 240 may include a first channel 240_1, a second channel 240_2, . . . , to an nth channel **240-*n*. The plurality of elements 250 may include a first element 250_1, a second element 250_2, . . . , to an nth element 250**_*n*. In describing the CPU 210, the controller 220, the power supply 230, the plurality of channels 240, and the plurality of elements 250 illustrated in FIG. 2, repeated descriptions as those given above with reference to FIG. 1 are omitted for conciseness.

In embodiments, the controller 220 may transmit a power control signal PCSIG indicating an operation of an operation request REQ to the power supply 230 via an interface. In embodiments, the power control signal PCSIG may include the value of operation mode corresponding to the operation. Although not shown in FIG. 2, in some embodiments, the controller 220 of FIG. 2 may also store a table 121 shown in FIG. 1.

In embodiments, the power supply 230 of FIG. 2 may store a table 232. In some embodiments, the table 232 may be identical to the table 121 discussed above with reference to FIG. 1. The power supply 230 may set, based on the power control signal PCSIG, the frequency and/or the number of power transistors to be activated corresponding to the operation of the operation request REQ in the table 232. The power supply 230 may generate at least one toggled gate signal on the basis of the set frequency and/or the set number of power transistors to be activated. The power supply 230 may generate the plurality of load supply voltages VO1, VO2, . . . , and VOn based on the system supply voltage VSYS, on the basis of the turn-on of at least one power transistor to be activated. The power supply 230 may transmit a set-done signal SDSIG to the controller 220 via an interface.

According to the embodiments described above, the operating frequency (e.g., the frequency of the gate signal) of the power supplies 130 and 230 and/or the number of power transistors to be activated are set for each operation, and thus, advantageously the power consumption of the electronic devices 100 and 200 may be reduced and optimized and the total cost of ownership (TCO) of a user using the electronic devices 100 and 200 may be reduced.

FIG. 3 is a diagram showing an example of a first table according to various embodiments.

Referring to FIG. 3, the first table may be provided in the table 121 and/or the table 232. In embodiments, the first table may include the frequency and the number of power transistors to be activated corresponding to each of a plurality of foreground operations FGOs. In other words, the table 121 and/or the table 232 may include, for each of the plurality of foreground operations FGO, a frequency and a number of power transistors to be activated for the foreground operation FGO. The frequency may include a frequency of a gate signal. Since the load is different for each of the plurality of foreground operations FGOs, the load current may be different for each foreground operation even if the generated load supply voltage is the same. The plurality of foreground operations FGOs may include various operations of a storage device, various operations of memory (or memory devices), or access methods or computational operations of other devices (e.g., a network interface card (NIC), a network adaptor, an AI accelerator, etc.). For example, the plurality of foreground operations FGOs may include sequential read SEQ READ, random read RAN READ, mixed operation MIX OP, random write RAN WRITE, and/or sequential write SEQ WRITE. In embodiments, the mixed operation MIX OP may represent an operation that includes the read operation and the write operation. The sequential read SEQ READ, the random read RAN READ, the mixed operation MIX OP, the random write RAN WRITE, and the sequential write SEQ WRITE may correspond to the first to fifth operation mode values OP MODE 1, OP MODE 2, OP MODE 3, OP MODE 4, and OP MODE 5, respectively, illustrated in FIG. 3. For example, if a signal (e.g., the power control signal PCSIG) includes a first operation mode value OP MODE 1, the signal may indicate the sequential read SEQ READ. However, embodiments are not limited to the examples described above.

For each of the sequential read SEQ READ, the random read RAN READ, the mixed operation MIX OP, the random write RAN WRITE, and the sequential write SEQ WRITE, the frequency of the gate signal and the number of power transistors to be activated (hereinafter, referred to as “number” for convenience of description) may be set. For example, in some embodiments, the frequency and the number of power transistors for the sequential read SEQ READ may be “F11” and “N11,” respectively. The frequency and the number of power transistors for random read RAN READ may be “F12” and “N12,” respectively. The frequency and the number of power transistors for the mixed operation MIX OP may be “F13” and “N13,” respectively. The frequency and the number of power transistors for the random write RAN WRITE may be “F14” and “N14,” respectively. The frequency and the number of power transistors for the sequential write SEQ WRITE may be “F15” and “N15,” respectively.

In some embodiments, regarding the sequential read SEQ READ, the random read RAN READ, the mixed operation MIX OP, the random write RAN WRITE, and the sequential write SEQ WRITE, the load of sequential read SEQ READ may be the smallest and the load of sequential write SEQ WRITE may be the largest. Therefore, among the frequencies “F11,” “F12,” “F13,” “F14,” and “F15” and the numbers “N11,” “N12,” “N13,” “N14,” and “N15,” the frequency “F15” and the number “N15” for the sequential write SEQ WRITE may be the largest, and the frequency “F11” and the number “N11” for the sequential read SEQ READ may be the smallest. For example, the magnitudes may increase in the order of “F11,” “F12,” “F13,” “F14,” and “F15,” and the sizes (i.e., the number of power transistors) may increase in the order of “N11,” “N12,” “N13,” “N14,” and “N15.” For example, “F11,” “F12,” and “F13” increase in magnitude in this order, and “F14” and “F15” may be greater than or equal to “F13.” “N11,” “N12,” and “N13” increase in number in this order. For example, “N11” may be less than “N12”, and “N12” may be less than “N13”. “N14” and “N15” may be greater than or equal to “N13.”

In some embodiments, the frequency “F13” and the number “N13” may be determined according to a ratio of each of the read operation and the write operation in the mixed operation MIX OP. For example, as the ratio of read operation becomes greater than the ratio of write operation in the mixed operation MIX OP, the frequency “F13” and the number “N13” may become closer to the frequency “F12” and the number “N12.” For example, as the ratio of write operation becomes greater than the ratio of read operation in the mixed operation MIX OP, the frequency “F13” and the number “N13” may become closer to the frequency “F14” and the number “N14.” However, embodiments are not limited to the examples described above. In some embodiments, the frequency “F13” and the number “N13” for the mixed operation MIX OP may be greater than the frequency “F14” and the number “N14.”

FIG. 4 is a diagram showing an example of a second table according to various embodiments.

Referring to FIG. 4, the second table may be provided in the table 121 and/or the table 232. In embodiments, the second table may include a frequency and a number of power transistors corresponding to each of a plurality of background operations BGOs. In other words, the table 121 and/or the table 232 may include, for each of the plurality of background operations BGO, a frequency and a number of power transistors to be activated for the background operation BGO. Since the load is different for each of the plurality of background operations BGOs, the load current may be different for each background operation even if the generated load supply voltage is the same. The plurality of background operations BGOs may include, for example, background operations of a storage device and/or background operations of a volatile memory device. The background operations of the storage device may include, for example, wear leveling, read reclaim, and/or garbage collection. The background operations of the volatile memory (e.g., dynamic random-access memory (DRAM)) may include, for example, self-refresh. The wear-leveling of the storage device involves a technique for preventing excessive degradation of specific memory blocks by ensuring that memory blocks in non-volatile memory (e.g., NAND flash memory) are used uniformly, and the wear-leveling may be performed through firmware techniques that balances the erase counts of physical blocks. The read reclaim involves a technique of guaranteeing read performance by moving data stored in a memory block to another memory block before an uncorrectable error occurs in the data stored in the memory block. The garbage collection involves a technique of securing available capacity in a non-volatile memory by copying valid data from a memory block to a new memory block and then erasing the existing memory block. The self-refresh involves a technique of preventing natural leakage and loss of data stored in a memory cell of DRAM by rewriting the data stored in the memory cell (e.g., the potential difference of a charged capacitor in the memory cell) at regular intervals. In some embodiments, the wear-leveling, read reclaim, or garbage collection of a storage device may include a read operation, write operation, or erase operation of a non-volatile memory (e.g., NAND flash memory). For example, referring to FIG. 4, the plurality of background operations BGOs of the second table may include background NAND read BKGRD NAND READ, background NAND write BKGRD NAND WRITE, and background NAND erase BKGRD NAND ERASE. However, embodiments are not limited to the examples described above.

For each of the background NAND read BKGRD NAND READ, the background NAND write BKGRD NAND WRITE, and the background NAND erase BKGRD NAND ERASE, the frequency and the number of power transistors may be set. For example, the frequency and the number of power transistors for the background NAND read BKGRD NAND READ may be "F21" and "N21," respectively. The frequency and the number of power transistors for the background NAND write BKGRD NAND WRITE may be "F22" and "N22," respectively. The frequency and the number of power transistors for the background NAND erase BKGRD NAND ERASE may be "F23" and "N23," respectively.

Figure 5:
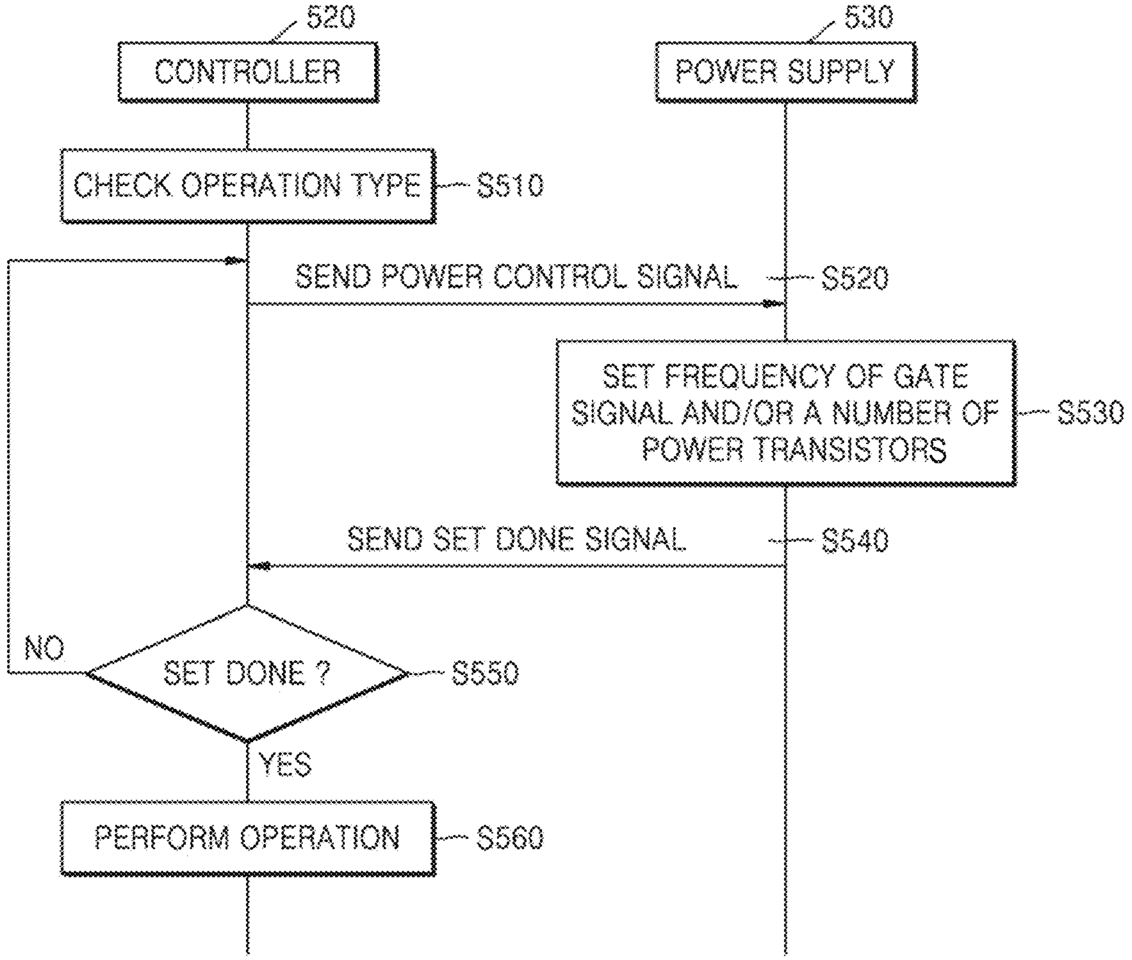
FIG. 5 is a diagram illustrating setting, based on an interface, a frequency and/or a number of power transistors to be activated, according to various embodiments.

FIG. 5 is a diagram illustrating setting, based on an interface, the frequency and/or the number of power transistors to be activated, according to some embodiments.

Referring to FIG. 5, in operation S510, a controller 520 may check the type of operation. For example, the controller 520 may use the operation request REQ transmitted by the CPU 110 to check the type of operation requested by the CPU 110.

In operation S520, the controller 520 may transmit a power control signal to a power supply 530. In embodiments, the controller 520 may transmit a first power control signal to the power supply 530 via an interface in response to a first operation request received from an external source (e.g., the CPU 110). In an embodiment, the first power control signal may include a frequency and/or a number of power transistors for the first operation of the first operation request. For example, when the interface between the controller 520 and the power supply 530 performs communication in an I2C method, the controller 520 may transmit a serial data (SDA) to the power supply 530 in synchronization with the serial clock (SCL) signal. The data specifications of the SDA transmitted by the controller 520 may include a start field, an address field, a write command field, a data field, and a stop field. In this case, the frequency of gate signals and/or the number of power transistors may be provided in the data field. In an embodiment, the first power control signal may indicate the first operation of the first operation request. That is, the first power control signal may include an operation mode value for the first operation. For example, when the interface between the controller 520 and the power supply 530 is of the I2C method, the data field of the SDA transmitted by the controller 520 may include the operation mode value.

In operation S530, the power supply 530 may set the frequency of the gate signal and/or the number of power transistors on the basis of the power control signal. In an embodiment, the power supply 530 may set the frequency of the gate signal and/or the number of power transistors provided in the first power control signal. For example, the power supply 530 may receive the SDA from the controller 520 in synchronization with SCL. In response to a write command of SDA, the power supply 530 may write or set the frequency of the gate signal and/or the number of power transistors provided in the data field to an internal register or the like. In an embodiment, the power supply 530 may store a table 232 and set the frequency of the gate signal and/or the number of power transistors on the basis of the operation mode value in the first power control signal.

In operation S540, the power supply 530 may transmit a set-done signal to the controller 520. In embodiments, the power supply 530 may transmit a first response signal with respect to a first power control signal to the controller 520 via the interface. The set-done signal may be provided as a signal specified in the standards for a separate communication interface or may be newly formed for the power control signal.

In operation S550, the controller 520 may determine whether the setting is complete. For example, the controller 520 may determine whether the setting is complete, on the basis of receiving the set-done signal from the power supply 530.

When the controller 520 determines that the setting is complete (S550, YES), the controller 520 may perform an operation according to the operation request in operation S560. For example, when the controller 520 receives the set-done signal from the power supply 530, the controller 520 may perform an operation according to the operation request in operation S560.

When the controller 520 determines that the setting is not complete (S550, NO), operation S520 may be performed. For example, when the controller 520 does not receive the set-done signal from the power supply 530 for a certain period of time or when the controller 520 receives a signal (e.g., NAK (NAK is an abbreviation for negative acknowledgement)) other than the set-done signal from the power supply 530, operation S520 may be performed.

Figure 6:
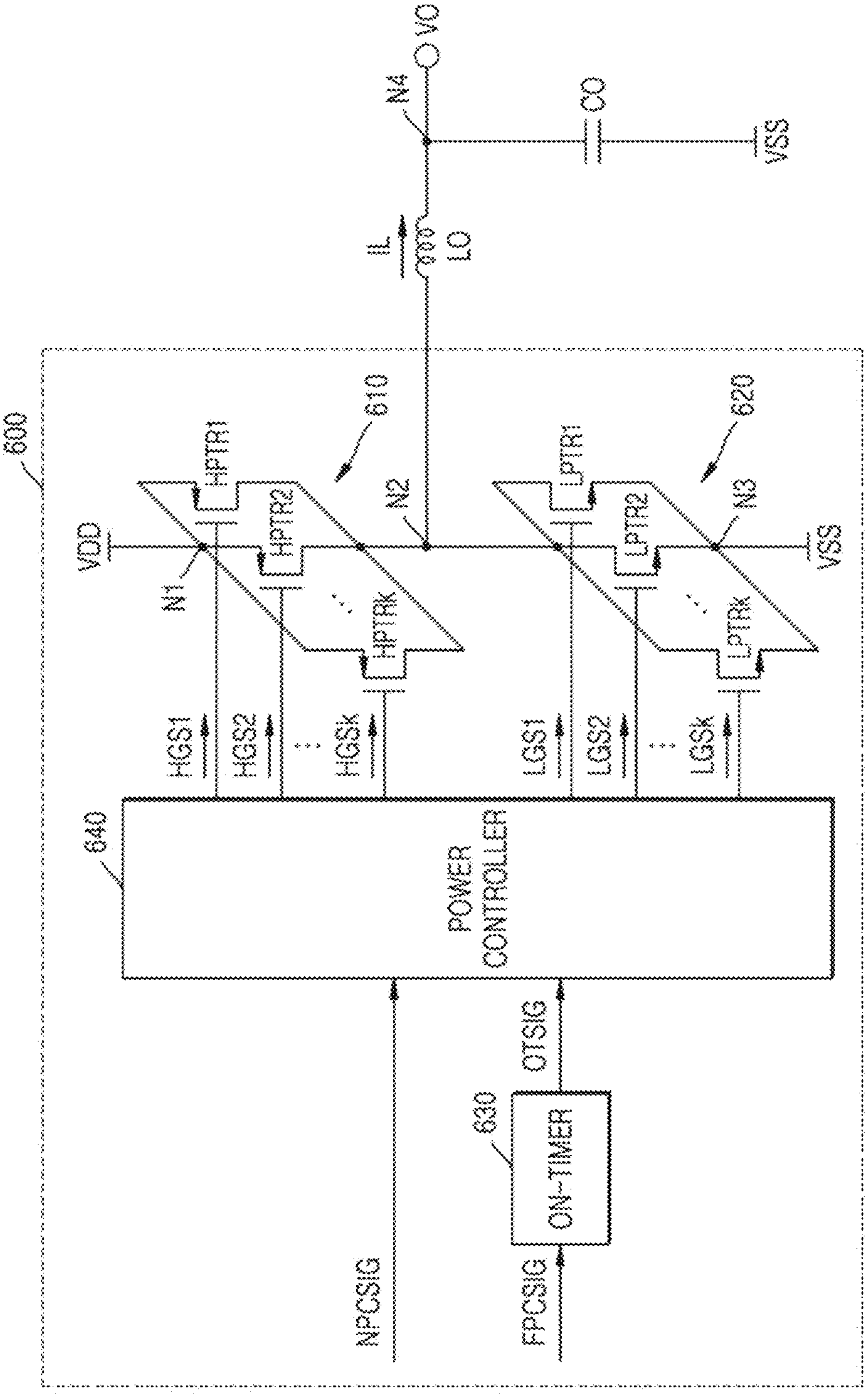
FIGS. 6 and 7 are diagrams showing power supplies according to various embodiments.
Figure 7:
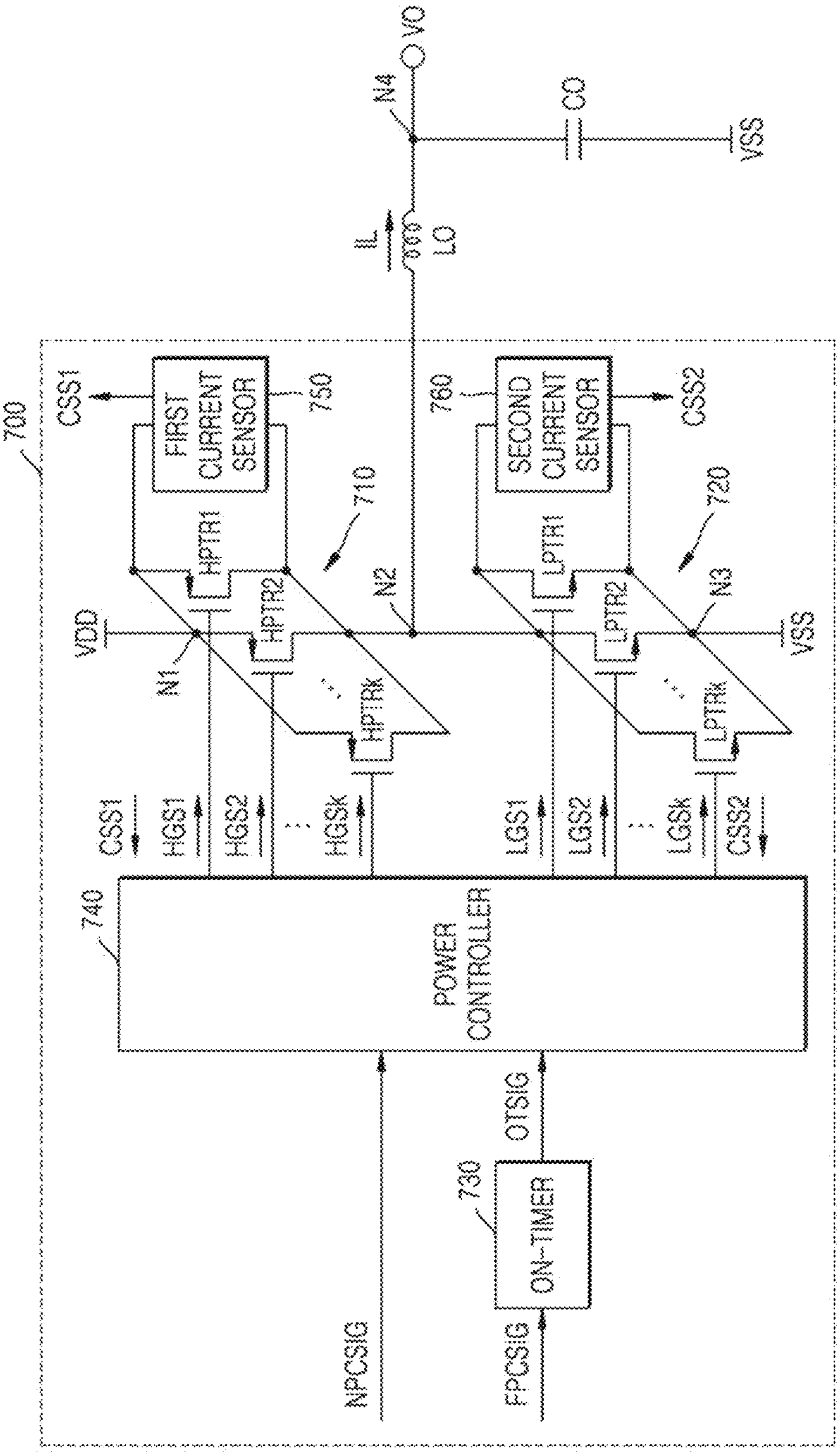

FIGS. 6 and 7 are diagrams showing buck converters according to various embodiments.

Referring to FIGS. 1, 2, and 6, in some embodiments, the power supply 130 may include a plurality of buck converters connected to the plurality of channels 140. FIG. 6 illustrates an example of a buck converter 600 connected to one channel. One buck converter in the power supply 130 may generate one load supply voltage VO via one channel. The plurality of buck converters may convert the system supply voltage VSYS into the plurality of load supply voltages VO1, VO2, . . . , and VOn by controlling the turn-on operation of each of the plurality of power transistors 131 according to the frequency and number of power transistors for the operation of the operation request REQ. The plurality of buck converters may supply the plurality of load supply voltages VO1, VO2, . . . , and VOn to the plurality of elements 150 via the plurality of channels 140.

The plurality of channels 140 connected to the power supply 130 may include inductors and capacitors. Referring to FIG. 6, for example, one channel connected to the buck converter 600 may include an inductor LO and a capacitor CO. The inductor LO may be connected to a second node N2 and a fourth node N4. The second node N2 may be referred to as an output node corresponding to one channel connected to the power supply 130. The load supply voltage VO may be applied to the fourth node N4. The capacitor CO may be connected between the fourth node N4 and a second supply voltage VSS. An LC filter (e.g., a low pass filter (LPF)) may be formed by the inductor LO and the capacitor CO. The inductor LO and the capacitor CO may remove high-frequency components appearing at an output terminal, allowing only direct current components to pass through and be delivered to the output terminal. The inductor LO stores energy generated by a load current IL flowing through the inductor LO and discharges the stored energy. The load current IL as an inductor current may flow due to the buck converting operation of the buck converter 600.

In embodiments, the buck converter 600 may include a plurality of upper power transistors 610, a plurality of lower power transistors 620, an on-timer 630, and a power controller 640.

The plurality of upper power transistors 610 may be connected in series with the plurality of lower power transistors 620 between a first node N1 and a third node N3. A first supply voltage VDD may be applied to the first node N1. The first supply voltage VDD may be generated based on the system supply voltage VSYS. In embodiments, the voltage level of the first supply voltage VDD may be less than or equal to the voltage level of the system supply voltage VSYS. The second supply voltage VSS may be applied to the third node N3. The second supply voltage VSS may have a voltage level lower than the voltage level of the first supply voltage VDD. In embodiments, the second supply voltage VSS may have a ground voltage of ground.

The number of each of the plurality of upper power transistors 610 and the plurality of lower power transistors 620 may be k. The number k may be a natural number greater than or equal to 2. In embodiments, the number of each of the plurality of upper power transistors 610 and the plurality of lower power transistors 620 may correspond to the number of a plurality of operations that may be supported by the electronic device 100. For example, k may be set to a value greater than or equal to the number of plurality of operations. When k is greater than the number of plurality of operations, the power transistors exceeding the number of plurality of operations may be spare transistors. In some embodiments, the plurality of upper power transistors 610 may be formed as P-type transistors and the plurality of lower power transistors 620 may be formed as N-type transistors. In this case, a first electrode of the plurality of upper and lower power transistors 610 and 620 may be a source, and a second electrode of the plurality of upper and lower power transistors 610 and 620 may be a drain. At least one of the plurality of upper power transistors 610 may be activated. At least one of the plurality of lower power transistors 620 may be activated. When the activated upper power transistor is turned on, the activated lower power transistor may be turned off. When the activated lower power transistor is turned on, the activated upper power transistor may be turned off. That is, the activated upper power transistor and the activated lower power transistor may be turned on alternately. As the number of power transistors turned on increases, the resistance value of the equivalent resistance of the turned-on power transistors decreases. As the number of power transistors turned on decreases, the resistance value of the equivalent resistance of the turned-on power transistors increases.

The plurality of upper power transistors 610 may be connected in parallel to each other between the first node N1 and the second node N2. Each of the plurality of upper power transistors 610 may include a gate for receiving an upper gate signal, a first electrode connected to a line to which the first supply voltage VDD is applied, and a second electrode connected to an output node (e.g., the second node N2). The gate electrode of a first upper power transistor HPTR1 may receive a first upper gate signal HGS1. The gate electrode of a second upper power transistor HPTR2 may receive a second upper gate signal HGS2. Similarly, the gate electrode of a kth upper power transistor HPTRk may receive a kth upper gate signal HGSk. The plurality of upper power transistors 610 may be turned on in response to the turn-on levels of the first to kth upper gate signals HGS1 to HGSk (or referred to as the plurality of upper gate signals HGS1 to HGSk). The first node N1 and the second node N2 are electrically connected to each other by the turned-on upper power transistor, and a first current may flow through the turned-on upper power transistor.

The plurality of lower power transistors 620 may be connected in parallel to each other between the second node N2 and the third node N3. Each of the plurality of lower power transistors 620 may include a gate for receiving a lower gate signal, a first electrode connected to the third node N3, and a second electrode connected to the second node N2. The gate electrode of a first lower power transistor LPTR1 may receive a first lower gate signal LGS1. The gate electrode of a second lower power transistor LPTR2 may receive a second lower gate signal LGS2. Similarly, the gate electrode of a kth lower power transistor LPTRk may receive a kth lower gate signal LGSk. The plurality of lower power transistors 620 may be turned on in response to the turn-on levels of the first to kth lower gate signals LGS1 to LGSk (or referred to as the plurality of lower gate signals LGS1 to LGSk). The second node N2 and the third node N3 are electrically connected to each other by the turned-on lower power transistor, and a second current may flow through the turned-on lower power transistor.

An on-timer 630 may receive a power control signal FPCSIG including the frequency of the gate signal. The on-timer 630 may adjust the turn-on time on the basis of the frequency of the gate signal included in the power control signal FPCSIG. The turn-on time may represent the period during which the plurality of upper and lower gate signals HGS1 to HGSk and LGS1 to LGSk maintain the turn-on level. The turn-off time may represent the period during which the plurality of upper and lower gate signals HGS1 to HGSk and LGS1 to LGSk maintain the turn-off level. The on-timer 630 may generate an on-time signal OTSIG including the turn-on time. The on-time signal OTSIG may be provided to the power controller 640.

In embodiments, as the frequency of the gate signal indicated by the power control signal FPCSIG increases, the turn-on time may decrease. As the frequency of the gate signal indicated by the power control signal FPCSIG decreases, the turn-on time may increase.

The power controller 640 may receive at least one of the on-time signal OTSIG or a power control signal NPCSIG including the number of power transistors to be activated. The number of transistors contained in the power control signal NPCSIG may indicate each of the number of activated upper power transistors and the number of activated lower power transistors. For example, when the number of transistors contained in the power control signal NPCSIG is i (where i is an integer of 1 to k), each of the number of activated upper power transistors and the number of activated lower power transistors is i. For example, assuming the number of transistor i is 2, then two upper power transistors of the upper power transistors would be activated, and two lower power transistors of the lower power transistors would be activated.

Based on the number of transistors contained in the power control signal NPCSIG (e.g., the number of power transistors to be activated), the power controller 640 may output at least one upper gate signal and at least one lower gate signal that toggle between the turn-on level and the turn-off level. For example, when the number of transistors contained in the power control signal NPCSIG is 1, the first upper gate signal HGS1 and the first lower gate signal LGS1 may toggle. For example, when the number of transistors contained in the power control signal NPCSIG is 2, in addition to the first upper and lower gate signals HGS1 and LGS1, the second upper gate signal HGS2 and the second lower gate signal LGS2 may toggle. Similarly, when the number of transistors contained in the power control signal NPCSIG is i, the first to ith upper and lower gate signals may toggle.

Based on the turn-on time contained in the on-time signal OTSIG, the power controller 640 may adjust the frequencies of the upper gate signals HGS1 to HGSk and the frequencies of the plurality of lower gate signals LGS1 to LGSk. The period during which the plurality of upper and lower gate signals HGS1 to HGSk and LGS1 to LGSk maintain the turn-on level may be adjusted, and thus, the frequencies of the plurality of upper and lower gate signals HGS1 to HGSk and LGS1 to LGSk may be changed. In some embodiments, the power controller 640 may control the turn-off time of the plurality of upper and lower gate signals HGS1 to HGSk and LGS1 to LGSk.

FIG. 7 illustrates an example of a buck converter 700 connected to one channel. Referring to FIGS. 1, 2, and 7, as described above with reference to FIG. 6, one buck converter 700 may be connected to one channel and may include a plurality of upper power transistors 710, a plurality of lower power transistors 720, an on-timer 730, and a power controller 740. The plurality of upper power transistors 710, the plurality of lower power transistors 720, and the on-timer 730 are as described above with reference to FIG. 6. The buck converter 700 may further include a first current sensor 750 and a second current sensor 760.

The first current sensor 750 may be connected to both terminals of the plurality of upper power transistors 710. When at least one of the upper power transistors 710 is turned on, the first current sensor 750 may sense a first current and output a first current sensing signal CSS1 including the value of the sensed first current.

The second current sensor 760 may be connected to both terminals of the plurality of lower power transistors 720. When at least one of the plurality of lower power transistors 720 is turned on, the second current sensor 760 may sense a second current and output a second current sensing signal CSS2 including the value of the sensed second current.

In some embodiments, the first current sensor 750 and the second current sensor 760 may be provided as separate components from the power controller 740. In some embodiments, the first current sensor 750 and the second current sensor 760 may be provided inside the power controller 740 as components included in the power controller 740.

Since the components of the buck converter 700 are electrically connected to each other to form a circuit path, the first current and the second current may correspond to a load current IL. Therefore, sensing the first current and the second current may be equivalent to sensing the load current IL.

In embodiments, the power controller 740 may change the number of toggled upper gate signals and the number of toggled lower gate signals on the basis of the first current sensing signal CSS1 and the second current sensing signal CSS2. In some embodiments, the power controller 740 may change the frequencies of a plurality of upper and lower gate signals HGS1 to HGSk and LGS1 to LGSk on the basis of the first current sensing signal CSS1 and the second current sensing signal CSS2. In some embodiments, when the value of the sensed load current IL increases, the power controller 740 may increase the frequencies of the plurality of upper and lower gate signals HGS1 to HGSk and LGS1 to LGSk and/or may increase the number of the plurality of upper power transistors 710 and the plurality of lower power transistors 720 being activated. When the value of the sensed load current IL decreases, the power controller 740 may reduce the frequencies of the plurality of upper and lower gate signals HGS1 to HGSk and LGS1 to LGSk and/or may increase the number of the plurality of upper power transistors 710 and the plurality of lower power transistors 720 being activated.

Figure 8:
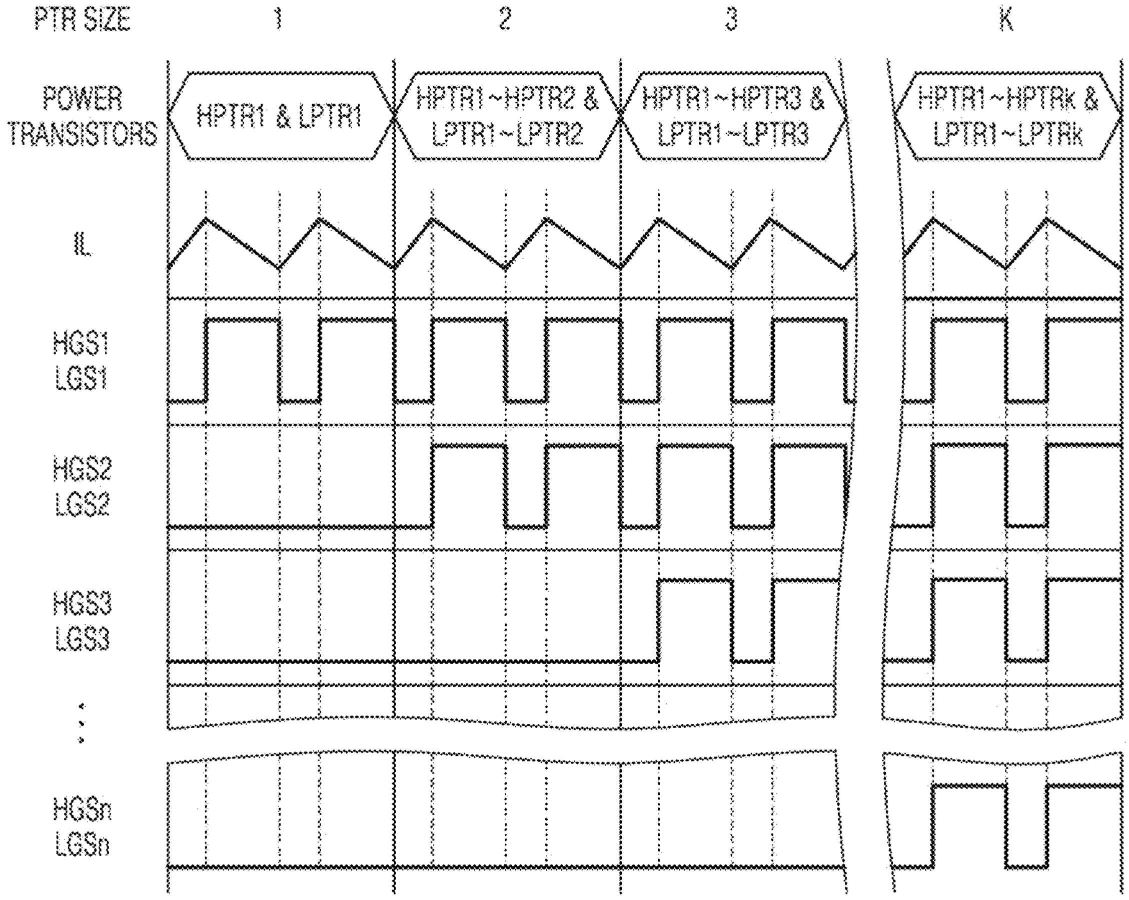
FIG. 8 is a timing chart showing load current and a plurality of gate signals according to the number of power transistors to be activated, according to various embodiments.

FIG. 8 is a timing chart showing load current and a plurality of gate signals according to the number of power transistors to be activated, according to some embodiments.

Referring to FIG. 8, in an embodiment, when a number PTR SIZE of power transistors to be activated (hereinafter, simply referred to as a number PTR SIZE) is 1, there may be one upper power transistor to be activated and one lower power transistor to be activated. For example, when the number PTR SIZE is 1, a first upper power transistor HPTR1 and a first lower power transistor LPTR1 may be activated. A first upper gate signal HGS1 and a first lower gate signal LGS1 may toggle. When the logic level of the first upper gate signal HGS1 and the logic level of the first lower gate signal LGS1 are at logic low levels, the first upper power transistor HPTR1 may be turned on and the first lower power transistor LPTR1 may be turned off. In this case, the load current IL may increase. When the logic level of the first upper gate signal HGS1 and the logic level of the first lower gate signal LGS1 are at logic high levels, the first upper power transistor HPTR1 may be turned off and the first lower power transistor LPTR1 may be turned on. In this case, the load current IL may decrease.

In an embodiment, when the number PTR SIZE is 2, the first and second upper power transistors HPTR1 and HPTR2 may be activated, and the first and second lower power transistors LPTR1 and LPTR2 may be activated. The first and second upper gate signals HGS1 and HGS2 may toggle, and the first and second lower gate signals LGS1 and LGS2 may toggle. The increase/decrease trend of the load current IL may be the same as the increase/decrease trend of the load current IL when the number PTR SIZE is 1.

In an embodiment, when the number PTR SIZE is 3, the first to third upper and lower power transistors HPTR1 to HPTR3 and LPTR1 to LPTR3 may be activated, and the first to third upper and lower gate signals HGS1 to HGS3 and LGS1 to LGS3 may toggle. The increase/decrease trend of the load current IL may be the same as described above.

In embodiments, as the number PTR SIZE decreases, the number of toggled upper and lower gate signals may decrease. As the number PTR SIZE increases, the number of toggled upper and lower gate signals may increase. In an embodiment, when the number PTR SIZE is k, the plurality of upper and lower gate signals HGS1 to HGSk and LGS1 to LGSk may toggle.

In an operation in which a relatively small load and load current IL occur, a switching loss may primarily affect power efficiency. In this case, in embodiments, the number PTR SIZE may be reduced to increase the resistance value of the equivalent resistance, thereby reducing the switching loss. As described above, there is an effect of improving the efficiency of power consumed in the operation in which a relatively small load occurs.

In an operation in which a relatively large load and load current IL occur, a conduction loss may primarily affect power efficiency. In this case, in embodiments, the number PTR SIZE may be increased to reduce the resistance value of the equivalent resistance, thereby reducing the conduction loss. As described above, there is an effect of improving the efficiency of power consumed in the operation in which a relatively large load occurs.

Figure 9:
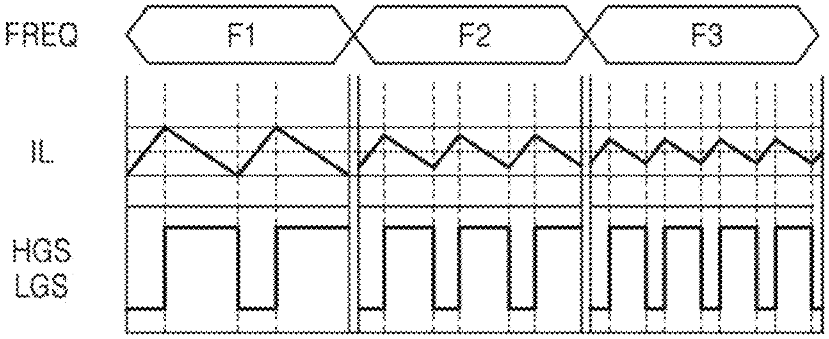
FIG. 9 is a timing chart showing load current and a plurality of gate signals according to the frequency of the gate signals, according to various embodiments.

FIG. 9 is a timing chart showing load current and a plurality of gate signals according to the frequency of the gate signals, according to some embodiments.

Referring to FIGS. 6, 7, and 9, as a frequency FREQ in the power control signal FPCSIG increases, the frequency of toggled upper and lower gate signals HGS and LGS may also increase. "F1," "F2," or "F3" may be examples of values representing the frequency FREQ. It is assumed that "F1" is the smallest, "F2" is larger than "F1" and smaller than "F3", and "F3" is the largest.

In an embodiment, as the frequency FREQ increases in the order of "F1," "F2," and "F3," the period during which the toggled upper and lower gate signals HGS and LGS maintain the turn-on level gradually decreases, and the frequency of the toggled upper and lower gate signals HGS and LGS may increase. As the period during which the toggled upper and lower gate signals HGS and LGS maintain the turn-on level changes, the increase/decrease trend of the load current IL may also change.

In the operation in which a relatively small load occurs, the embodiments may reduce the switching loss by reducing the frequency FREQ. As described above, there is an effect of improving the power efficiency in the operation in which a relatively small load occurs.

In the operation in which a relatively large load occurs, the embodiments may reduce the conduction loss by increasing the frequency FREQ. As described above, there is an effect of improving the power efficiency in the operation in which a relatively large load occurs.

Figure 10:
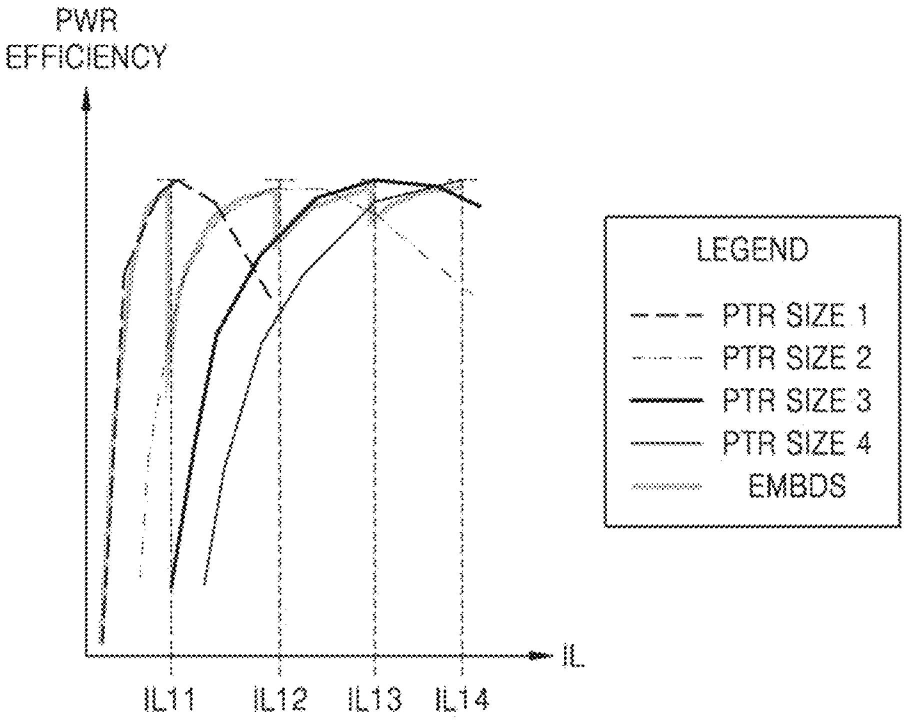
FIG. 10 is a graph showing an example of power efficiency according to the number of power transistors to be activated, according to various embodiments.

FIG. 10 is a graph showing an example of power efficiency according to the number of power transistors to be activated, according to some embodiments.

Referring to FIG. 10, the graph showing the relationship between power efficiency PWR EFFICIENCY and a load current IL may vary depending on the numbers of power transistors to be activated. The load current IL at maximum power efficiency may vary depending on the different numbers of power transistors to be activated. Referring to FIG. 10, for example, the number of power transistors to be activated may increase in size in the following order: a first number PTR SIZE 1, a second number PTR SIZE 2, a third number PTR SIZE 3, and a fourth number PTR SIZE 4. That is, the first number PTR SIZE 1 may be the smallest, and the fourth number PTR SIZE 4 may be the largest. The load currents IL that produces the maximum power efficiencies in the first to fourth numbers PTR SIZE 1, PTR SIZE 2, PTR SIZE 3, and PTR SIZE 4 may be first to fourth load currents IL11, IL12, IL13, and IL14. The load currents may increase in magnitude in the following order: the first load current IL11, the second load current IL2, the third load current IL3, and the fourth load current IL14. However, embodiments are not limited to the examples described above. An embodiment EMBDS may increase the number of power transistors to be activated when the load and load current IL increases, and may decrease the number of power transistors to be activated when the load and load current IL decreases. The embodiment EMBDS may provide the maximum power efficiency for each operation by setting the number of power transistors to be activated in response to the operation request.

Figure 11:
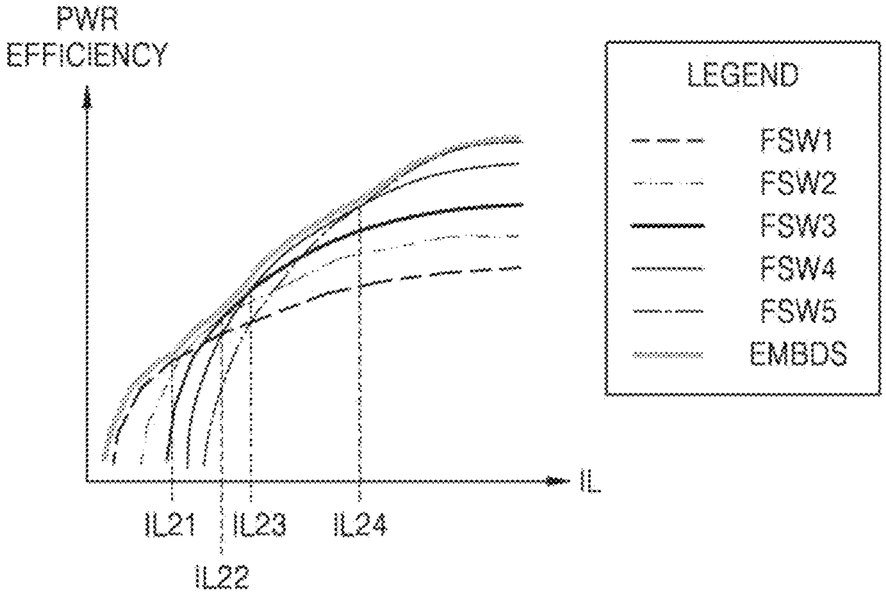
FIG. 11 is a graph showing an example of power efficiency according to the frequency of a gate signal, according to various embodiments.

FIG. 11 is a graph showing an example of power efficiency according to the frequency of a gate signal, according to some embodiments.

Referring to FIG. 11, the graph showing the relationship between the power efficiency PWR EFFICIENCY and the load current IL may vary depending on the frequencies of gate signals. In each frequency graph, there may be a section of the graph having higher power efficiency PWR EFFICIENCY depending on the load current IL. For example, the frequencies may increase in magnitude in the following order: a first frequency FSW1, a second frequency FSW2, a third frequency FSW3, a fourth frequency FSW4, and a fifth frequency FSW5. That is, the first frequency FSW1 may be the smallest and the fifth frequency FSW5 may be the largest. The first to fourth load currents IL21, IL22, IL23, and IL24 may represent the load currents IL when the magnitude relationship of the power efficiency PWR EFFICIENCY changes. For example, the fourth load current IL24 may represent the load current IL when the power efficiency PWR EFFICIENCY for the fifth frequency FSW5 in the graph is higher than the power efficiency PWR EFFICIENCY for the fourth frequency FSW4 in the graph. A section in which the load current IL is greater than the fourth load current IL24 may represent a section in which a relatively large load occurs, i.e., a section in which a heavy load occurs. A section in which the load current IL is less than the fourth load current IL24 may represent a section in which a relatively small load occurs, i.e., a section in which a light load occurs. An embodiment EMBDS may increase the frequency of the gate signal when the load and load current IL increase, and may decrease the frequency of the gate signal when the load and load current IL decrease. The embodiment EMBDS may provide the maximum power efficiency for each operation by setting the frequency of the gate signal in response to the operation request.

Figure 12:
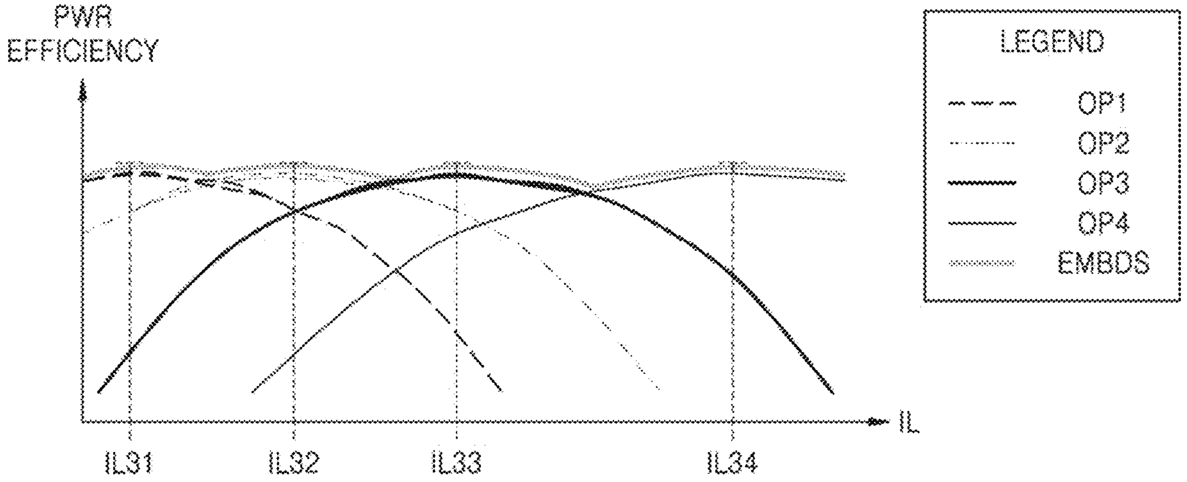
FIG. 12 is a graph showing an example of power efficiency according to operations, according to various embodiments.

FIG. 12 is a graph showing an example of power efficiency according to operations, according to some embodiments.

Referring to FIG. 12, the graph showing the relationship between the power efficiency PWR EFFICIENCY and the load current IL may vary depending on operations. The load currents IL that exhibit the maximum efficiencies for a plurality of operations may also be different from each other and may be represented as first to fourth load currents IL31, IL32, IL33, and IL34. The first to fourth load currents IL31, IL32, IL33, and IL34 may correspond to the first to fourth load currents IL11, IL12, IL13, and IL14 of FIG. 10 and/or the first to fourth load currents IL21, IL22, IL23, and IL24 of FIG. 11, respectively. The embodiment EMBDS may provide the maximum power efficiency for each operation by setting the frequency of the gate signals and/or the number (e.g., the number of power transistors to be activated) according to the operation in response to the operation request.

Figure 13:
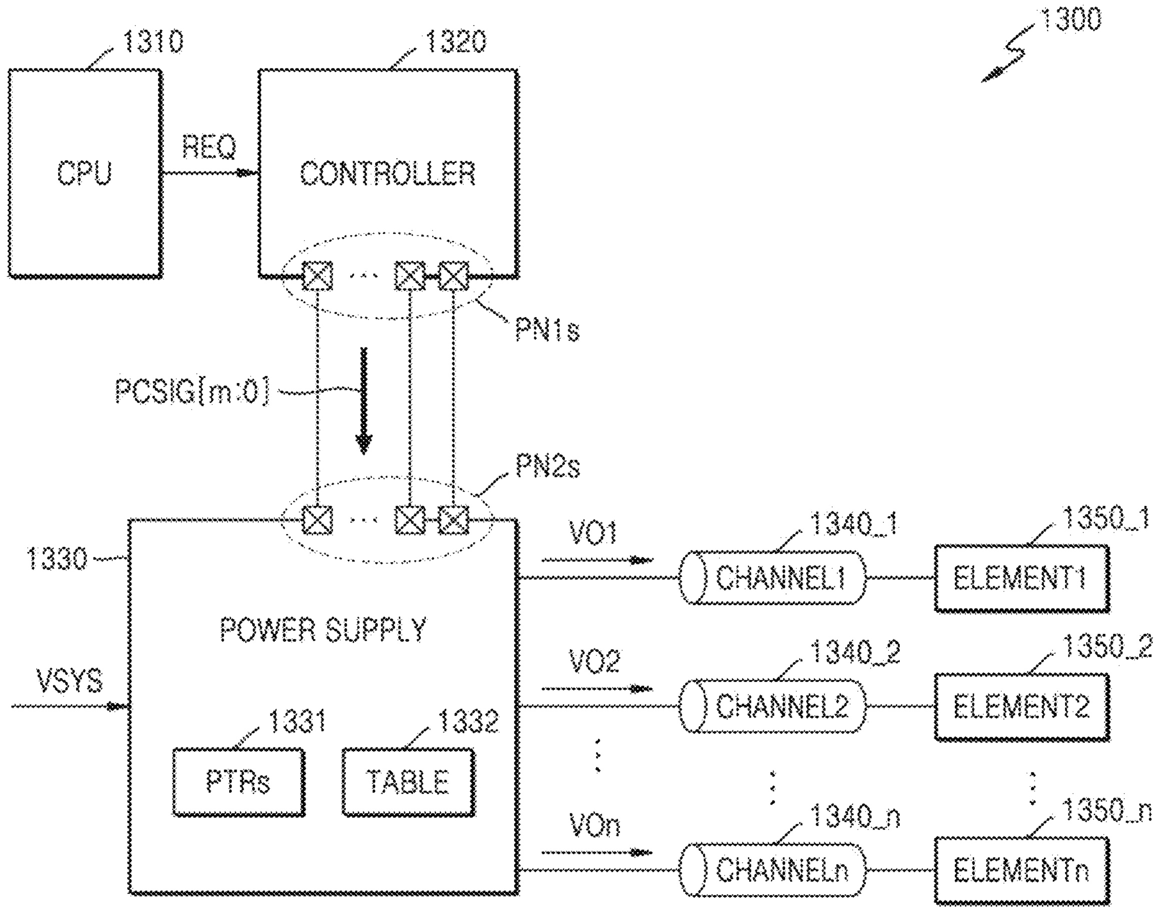
FIG. 13 is a block diagram of an electronic device according to various embodiments.

FIG. 13 is a block diagram of an electronic device 1300 according to an embodiment.

Referring to FIG. 13, like the electronic devices 100 and 200, the electronic device 1300 may include a CPU 1310, a controller 1320, a power supply 1330, a first channel 1340_1, a second channel 1340_2, . . . , to an nth channel 1340_*n*, and a first element 1350_1, a second element 1350_2, . . . , to an nth element 1350_*n*. In describing the CPU 1310, the controller 1320, the power supply 1330, the first to nth channels 1340_1 to 1340_*n*, and the first to nth elements 1350_1 to 1350_*n* illustrated in FIG. 13, repeated descriptions as those given above with reference to FIGS. 1 and 2 are omitted for conciseness.

The controller 1320 may receive an operation request REQ from the CPU 1310. The controller 1320 may transmit a power control signal PCSIG[m:0] indicating the operation of the operation request REQ to the power supply 1330.

Each of the controller 1320 and the power supply 1330 may be provided with at least one pin. For example, the controller 1320 may have a plurality of first pins PN1*s* and the power supply 1330 may have a plurality of second pins PN2*s*. The controller 1320 may be communicatively connected to the power supply 1330 by physically connecting the plurality of first pins PN1*s* to the plurality of second pins PN2*s*. In embodiments, the plurality of first pins PN1*s* and the plurality of second pins PN2*s* may be provided as a general-purpose input/output (GPIO), as dedicated pins, or as an input/output (IO), etc. However, embodiments are not limited to the embodiments described above.

The power control signal PCSIG[m:0] may include a signal transmitted via the plurality of first pins PN1*s* and the plurality of second pins PN2*s*. The power control signal PCSIG[m:0] may include a plurality of bits. For example, the power control signal PCSIG[m:0] may include m+1 bits. However, embodiments are not limited to the examples described above. The number m may be a natural number greater than or equal to 1. One bit of the power control signal PCSIG[m:0] may be output via one first pin and transmitted to the power supply 1330 via one second pin. The number of bits in the power control signal PCSIG[m:0] may be greater than or equal to the number of connected pins. When the number of each of the first pins PN1*s* and the second pins PN2*s* is 3, the number of bits of the power control signal PCSIG[m:0] may be 3, and m may be 2. The number of bits of the power control signal PCSIG[m:0], the plurality of first pins PN1*s*, and the plurality of second pins PN2*s* may express all of the plurality of operations. For example, when the number of plurality of operations is 4, the number of plurality of first pins PN1*s* and the number of plurality of second pins PN2*s* may be 2 or more, and m may be 1. In this case, a power control signal PCSIG[1:0] may include “00,” “01,” “10,” or “11.” The values “00,” “01,” “10,” or “11” may represent the operation mode value for each of the four operations.

The power supply 1330 may include a plurality of power transistors PTRs 1331 and may store a table 1332. In embodiments, the table 1332 may include the first table of FIG. 3. In some embodiments, the table 1332 may further include the second table of FIG. 4.

Based on the power control signal PCSIG[m:0] and the table 1332, the power supply 1330 may generate at least one gate signal that is input to at least one power transistor to be activated among the plurality of power transistors 1331. The power supply 1330 may set the frequency of the gate signals and/or the number of power transistors, corresponding to the operation mode value of the power control signal PCSIG [m:0] on the basis of the table stored therein.

The power supply 1330 may generate a plurality of load supply voltages VO1, VO2, . . . , and VOn based on a system supply voltage VSYS, on the basis of the turn-on of at least one power transistor.

According to the embodiments described above, power consumption of the electronic device 1300 may be reduced and optimized and the TCO of a user may be reduced.

Figure 14:
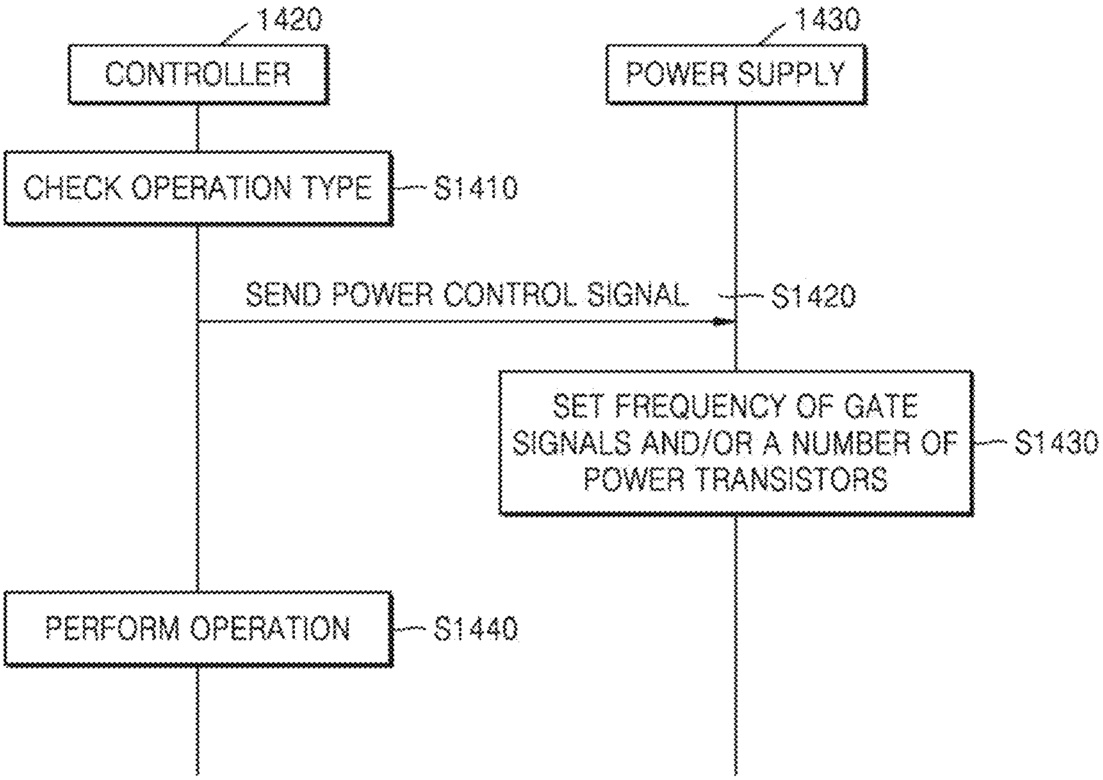
FIG. 14 is a diagram illustrating setting, based on a pin connection, the frequency and/or the number of power transistors to be activated, according to various embodiments.

FIG. 14 is a diagram illustrating setting, based on a pin connection, the frequency and/or the number of power transistors to be activated, according to some embodiments.

Referring to FIG. 14, operation S1410 is the same as operation S510 and a repeated description thereof is omitted for conciseness. In operation S1420, a controller 1420 may transmit a power control signal to a power supply 1430. For example, in some embodiments, the controller 1420 may transmit a first power control signal to the power supply 1430 via the plurality of first pins PN1*s* in response to a first operation request of the CPU 1310. In some embodiments, similar to the power control signal PCSIG[m:0] of FIG. 13, the first power control signal may include an operation mode value.

In operation S1430, on the basis of the power control signal, the power supply 1430 may set the frequency of gate signals and/or the number (e.g., the number of power transistors to be activated) corresponding to the operation mode value in the table stored therein.

In operation S1440, the controller 1420 may perform an operation according to the operation request. Referring to FIG. 13, for example, the controller 1320 may have the plurality of first pins PN1*s* for transmitting the power control signal PCSIG[m:0], and the power supply 1330 may have the plurality of second pins PN2*s* connected to the plurality of first pins PN1*s* and receiving the power control signal PCSIG[m:0]. The controller 1320 may perform an operation by generating a command for instructing that the operation be performed, after transmitting the power control signal PCSIG[m:0] to the power supply 1330.

Figure 15:
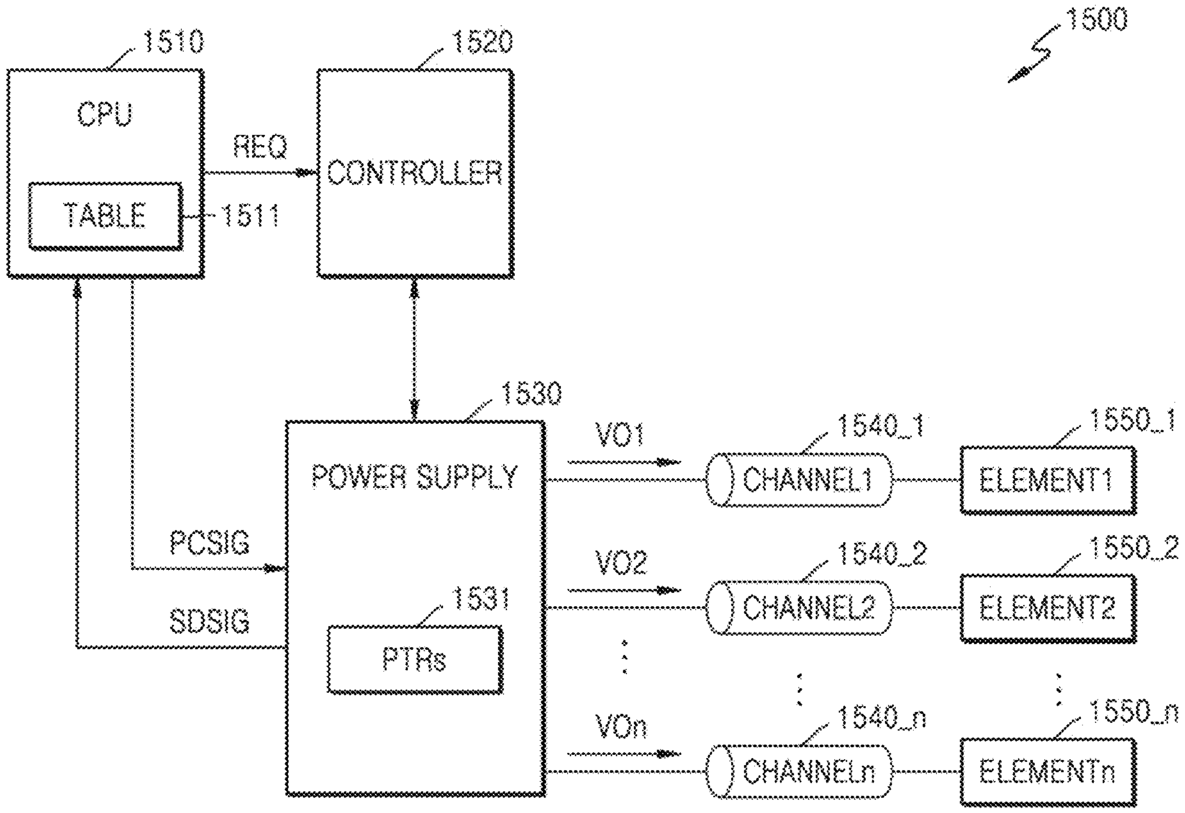
FIGS. 15 and 16 are block diagrams of electronic devices according to various embodiments.
Figure 16:
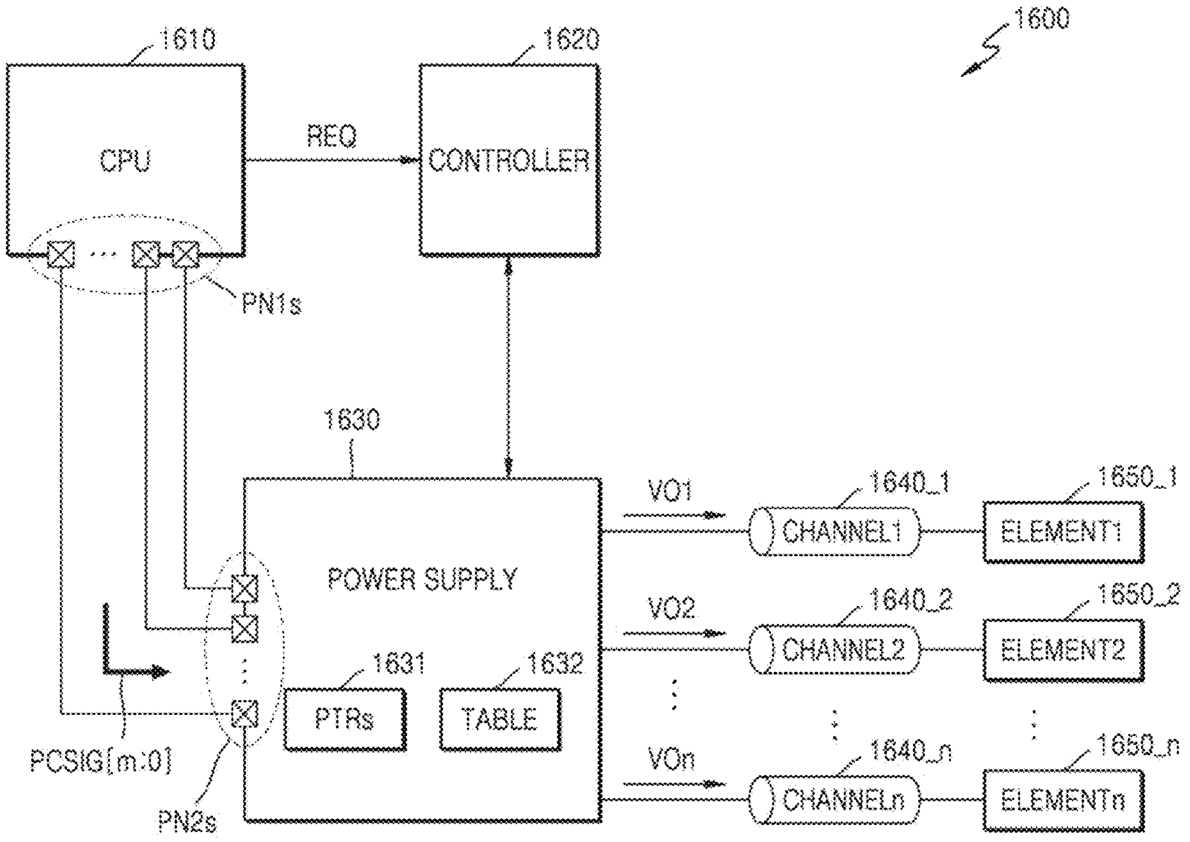

FIGS. 15 and 16 are block diagrams of electronic devices 1500 and 1600 according to some embodiments.

Referring to FIG. 15, like the electronic devices 100, 200, and 1300, the electronic device 1500 may include a CPU 1510, a controller 1520, a power supply 1530, a first channel 1540_1, a second channel 1540_2, . . . , to an nth channel 1540_*n*, and a first element 1550_1, a second element 1550_2, . . . , to an nth element 1550_*n*. In describing the CPU 1510, the controller 1520, the power supply 1530, the first to nth channels 1540_1 to 1540_*n*, and the first to nth elements 1550_1 to 1550_*n* illustrated in FIG. 15, repeated descriptions as those given above with reference to FIGS. 1, 2, and 13 are omitted for conciseness.

In embodiments, the CPU 1510 may store a table 1511, such as the tables 121, 232, and 1322 described above. The CPU 1510 may communicate with the power supply 1530 via an interface. In some embodiments, the interface may include an I2C interface or the like. The CPU 1510 may transmit a power control signal PCSIG to the power supply 1530 on the basis of the table 1511. In an embodiment, the power control signal PCSIG may include the number (e.g., the number of power transistors to be activated) and/or the frequency of the gate signals. In an embodiment, the power control signal PCSIG may include an operation mode value. The CPU 1510 may set the frequency of the gate signals and/or the number of power transistors, corresponding to the operation mode value of the power control signal PCSIG on the basis of the table stored therein.

In embodiments, the power supply 1530 may transmit a set-done signal SDSIG to the CPU 1510 via an interface.

Referring to FIG. 16, like the electronic devices 100, 200, 1300, and 1500, the electronic device 1600 may include a CPU 1610, a controller 1620, a power supply 1630, a first channel 1640_1, a second channel 1640_2, . . . , to an nth channel 1640_*n*, and a first element 1650_1, a second element 1650_2, . . . , to an nth element 1650_*n*. In describing the CPU 1610, the controller 1620, the power supply 1630, the first to nth channels 1640_1 to 1640_*n*, and the first to nth elements 1650_1 to 1650_*n* illustrated in FIG. 16, repeated descriptions as those given above with reference to FIGS. 1, 2, 13, and 15 are omitted for conciseness.

In embodiments, the CPU 1610 may transmit a power control signal PCSIG[m:0] indicating the operation of the operation request REQ to the power supply 1630. To this end, each of the CPU 1610 and the power supply 1630 may have at least one pin. For example, the CPU 1610 may have a plurality of first pins PN1*s* and the power supply 1630 may have a plurality of second pins PN2*s*. The plurality of first pins PN1*s* and the plurality of second pins PN2*s* may be provided as a GPIO, as dedicated pins, or as IO, etc. The power control signal PCSIG[m:0] may be transmitted from the plurality of first pins PN1*s* to the plurality of second pins PN2*s*. The bit values of the power control signal PCSIG[m:0] may represent the operation mode value.

The power supply 1630 may include a plurality of power transistors PTRs 1631. The power supply 1630 may store a table 1632, such as the tables 121, 232, 1322, and 1511 described above. The power supply 1630 may set the frequency of the gate signals and/or the number of power transistors, corresponding to the operation mode value of the power control signal PCSIG[m:0] on the basis of the table stored therein.

According to the embodiments described above, the power consumption of the electronic devices 1500 and 1600 may be reduced and optimized and the TCO of a user may be reduced.

Figure 17:
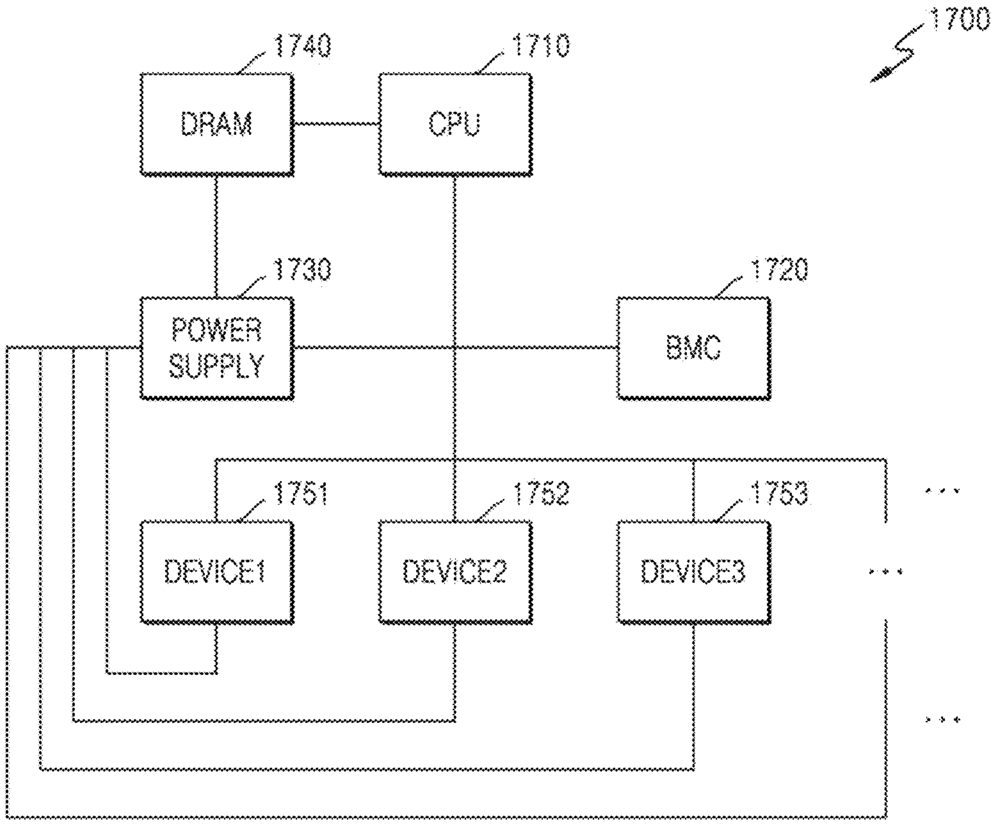
FIG. 17 is a block diagram of an electronic system according to various embodiments.

FIG. 17 is a block diagram of an electronic system 1700 according to some embodiments.

Referring to FIG. 17, the electronic system 1700 may be a system including one or more electronic devices. The electronic system 1700 may include a CPU 1710, a BMC 1720, a power supply 1730, a DRAM 1740, and a plurality of devices 1751, 1752, and 1753. In describing the CPU 1710, the BMC 1720, the power supply 1730, the DRAM 1740, and the plurality of devices 1751, 1752, and 1753, repeated descriptions as those given above with reference to FIGS. 1, 2, 13, 15, and 16 are omitted for conciseness.

In some embodiments, the CPU 1710 may correspond to the CPU 1510 of FIG. 15 and may generate a power control signal PCSIG on the basis of a table stored therein. In an embodiment, as described above with reference to FIG. 1, the power control signal PCSIG may include the frequency of the gate signals and the number of power transistors to be activated, for the current operation to be performed. In an embodiment, as described above with reference to FIG. 2, the power control signal PCSIG may include the operation mode value corresponding to the current operation to be performed. The CPU 1710 and the power supply 1730 may communicate with each other via an interface, and the power supply 1730 may transmit an ACK signal, a NAK signal, or a set-done signal SDSIG to the CPU 1710.

In some embodiments, the CPU 1710 may correspond to the CPU 1510 of FIG. 16 and generate a power control signal PCSIG[m:0]. The CPU 1710 may be communicatively connected to the power supply 1730 via at least one pin. The CPU 1710 may transmit a power control signal PCSIG[m:0] to the power supply 1730 via at least one pin. The power supply 1730 may set the frequency of the gate signals and/or the number of power transistors, corresponding to the operation mode value of the power control signal PCSIG[m:0] on the basis of the table stored therein.

In some embodiments, the BMC 1720 may correspond to the controller 120 of FIG. 1, the controller 220 of FIG. 2, and/or the controller 520 of FIG. 5. The BMC 1720 according to an embodiment may generate a power control signal PCSIG on the basis of an operation request REQ received from the CPU 1710 and the table stored therein. In an embodiment, as described above with reference to FIG. 1, the power control signal PCSIG may include the frequency of the gate signals and the number of power transistors to be activated. In an embodiment, as described above with reference to FIG. 2, the power control signal PCSIG may include the operation mode value. The BMC 1720 and the power supply 1730 may communicate with each other via an interface, and the power supply 1730 may transmit an ACK signal, a NAK signal, or a set-done signal SDSIG to the BMC 1720.

In some embodiments, the BMC 1720 may correspond to each of the controller 1320 of FIG. 13 and the controller 1420 of FIG. 14. The BMC 1720 according to an embodiment may generate a power control signal PCSIG[m:0] on the basis of an operation request REQ received from the CPU 1710. The BMC 1720 may be communicatively connected to the power supply 1730 via at least one pin. The power supply 1730 may set the frequency of the gate signals and/or the number of power transistors, corresponding to the operation mode value of the power control signal PCSIG[m:0] on the basis of the table stored therein.

In some embodiments, the power supply 1730 may sense load currents flowing through power rails so as to monitor power consumption per power rail, as described above with reference to FIG. 7.

In some embodiments, elements that receive load supply voltages from the power supply 1730 via a plurality of channels may include, for example, the CPU 1710, the BMC 1720, the DRAM 1740, and the plurality of devices 1751, 1752, and 1753. The plurality of devices 1751, 1752, and 1753 may include, for example, a graphics card, a sound card, a storage device, a USB device, a NIC, etc.

According to the embodiments described above, the power consumption of the electronic system 1700 may be reduced and optimized and the TCO of a user may be reduced.

FIGS. 18 to 21 are block diagrams of storage systems 1800, 1900, 2000, and 2100 according to some embodiments. The embodiments described above may be applied to the storage systems 1800, 1900, 2000, and 2100 illustrated in FIGS. 18 to 21.

Figure 18:
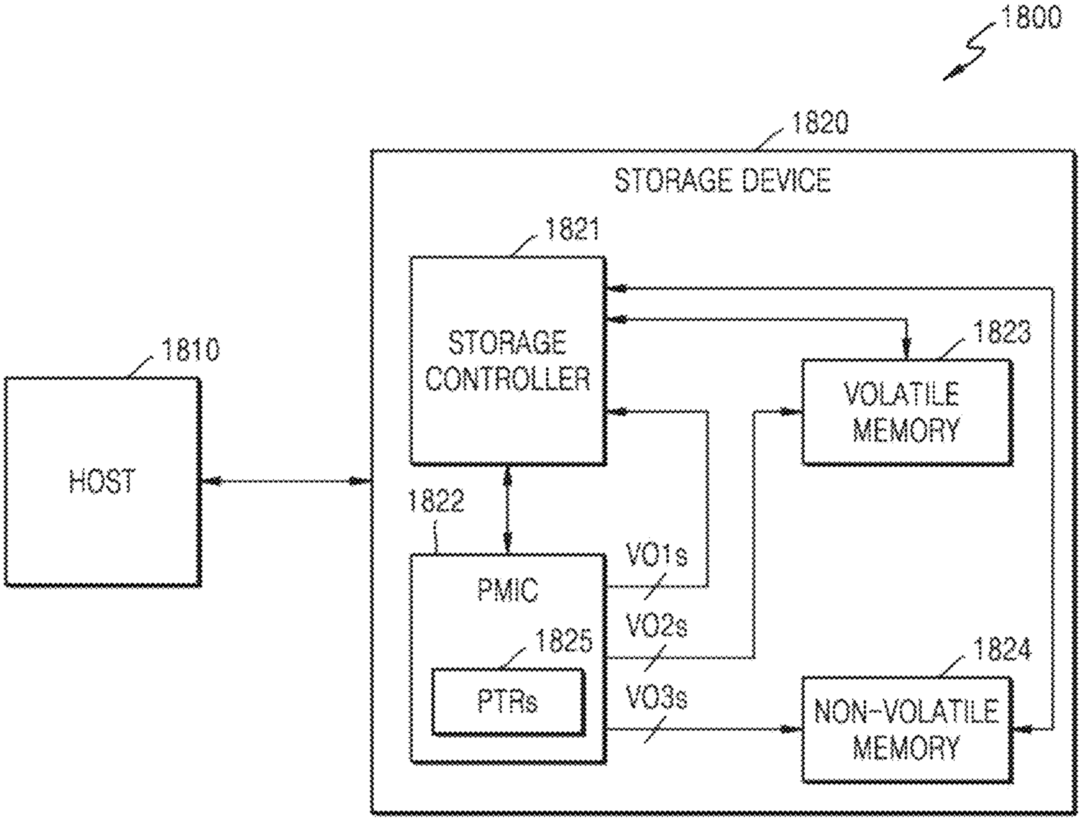
FIGS. 18 to 21 are block diagrams of storage systems according to various embodiments.

Referring to FIG. 18, the storage system 1800 may include a host 1810 and a storage device 1820.

The host 1810 may manage operations, such as storing data in the storage device 1820 and reading data from the storage device 1820. In embodiments, the operations requested by the host 1810 to the storage device 1820 may include sequential read, sequential write, mix operation, random read, and/or random write. In embodiments, the host 1810 may include the CPU described above. The host 1810 according to embodiments may further include the BMC 1720 or the DRAM 1740 of FIG. 17, a power source, or the like.

In embodiments, the host 1810 may provide an operation request REQ and a power control signal PCSIG to a storage controller 1821. The storage controller 1821 may provide the power control signal PCSIG to a power management integrated circuit (PMIC) 1822.

The storage device 1820 may include storage media for storing data in response to a request from the host 1810. For example, the storage device 1820 may include at least one of a solid state drive (SSD), embedded memory, or removable external memory. When the storage device 1820 includes the SSD, the storage device 1820 may include devices that comply with NVMe standards. When the storage device 1820 includes the embedded memory or the external memory, the storage device 1820 may include devices that comply with UFS or eMMC standards. The host 1810 and the storage device 1820 may each generate and transmit a packet according to the adopted standard protocol.

The storage device 1820 may include a storage controller 1821, a PMIC 1822, volatile memory 1823, and non-volatile memory 1824. The storage device 1820 may further include at least one voltage regulator in addition to the PMIC 1822.

The storage controller 1821 may include a host interface, a memory interface, a CPU, a flash translation layer (FTL), a packet manager, a buffer memory, an error correction code (ECC) engine, and/or an advanced encryption standard (AES) engine.

The PMIC 1822 may perform the operations of the power supply described above. The PMIC 1822 may supply a plurality of load supply voltages to each of the storage controller 1821, the volatile memory 1823, and the non-volatile memory 1824 via a plurality of channels. For example, the PMIC 1822 may supply first load supply voltages VO1*s* to the storage controller 1821 via some of the plurality of channels. For example, the PMIC 1822 may supply second load supply voltages VO2*s* to the volatile memory 1823 via some of the plurality of channels. For example, the PMIC 1822 may supply third load supply voltages VO3*s* to the non-volatile memory 1824 via some of the plurality of channels. The PMIC 1822 may include a plurality of power transistors PTRs 1825.

The volatile memory 1823 may store data when power is supplied to the storage device 1820.

The non-volatile memory 1824 may store data regardless of power supply. When the non-volatile memory 1824 includes flash memory, the flash memory may include a 2D NAND memory array or a 3D (or vertical) NAND (VNAND) memory array. In some embodiments, the storage device 1820 may include other types of non-volatile memory. For example, in some embodiments, the storage device 1820 may include magnetic random-access memory (MRAM), spin-transfer torque MRAM, conductive bridging RAM (CBRAM), ferroelectric RAM (FeRAM), phase RAM (PRAM), resistive RAM, and/or other types of memory.

Figure 19:
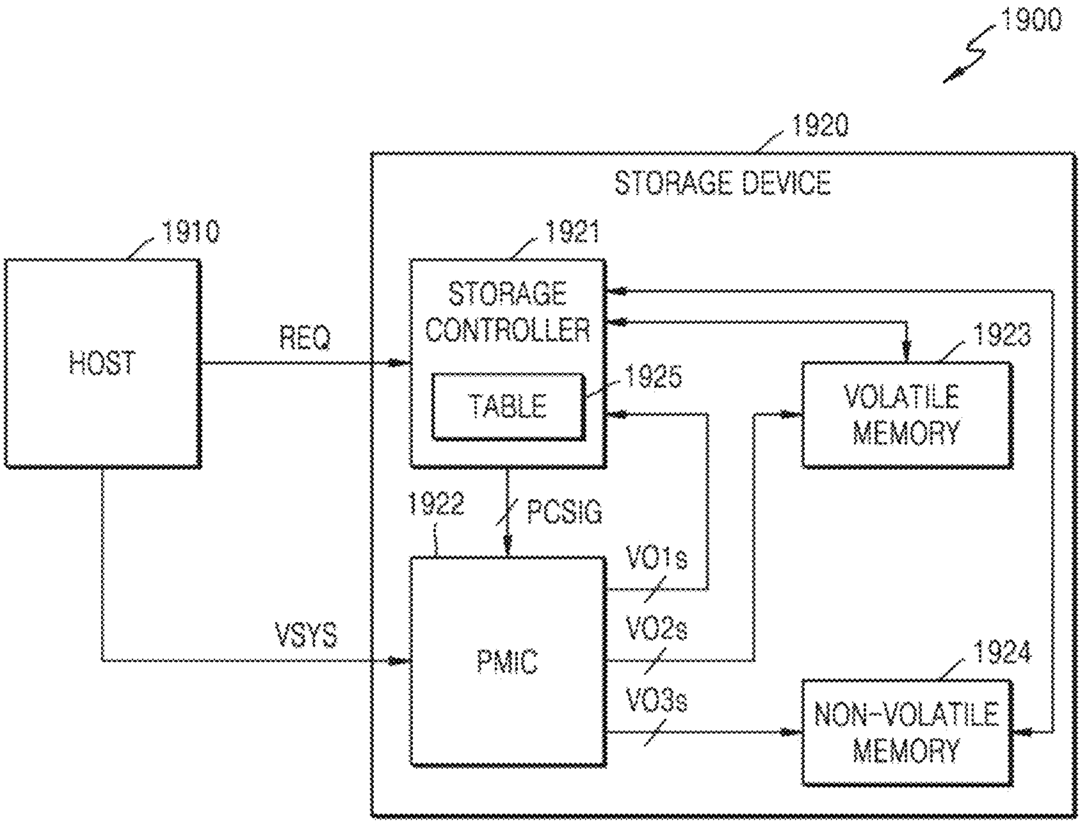

Referring to FIG. 19, the storage system 1900 may include a host 1910 and a storage device 1920. The storage device 1920 may include a storage controller 1921, a PMIC 1922, a volatile memory 1923, and a non-volatile memory 1924. Repeated descriptions as those given above with reference to FIG. 18 are omitted for conciseness.

In embodiments, the host 1910 may provide an operation request REQ to the storage controller 1921 and supply a system supply voltage VSYS to the PMIC 1922.

The storage controller 1921 may transmit, to the volatile memory 1923 and/or the non-volatile memory 1924, a command for instructing that the operation be performed, on the basis of the operation request REQ.

In embodiments, the storage controller 1921 may store a table 1925. The table 1925 may include the first table of FIG. 3. The table 1925 may further include the second table of FIG. 4. The storage controller 1921 may correspond to the controller 120 of FIG. 1 and the controller 520 of FIG. 5. The storage controller 1921 may generate at least one power control signal PCSIG on the basis of the operation request REQ and the table 1925 received from the host 1910. In an embodiment, at least one power control signal PCSIG may include a first power control signal including the frequency of the gate signals and/or a second power control signal including the number of power transistors to be activated. The storage controller 1921 and the PMIC 1922 may communicate with each other via an interface, and the PMIC 1922 may transmit an ACK signal, a NAK signal, or a set-done signal SDSIG to the storage controller 1921.

In embodiments, when the storage device 1920 is in an idle state, the storage controller 1921 may transmit, in the idle state, a fourth power control signal including the frequency of the gate signals and the number of power transistors for a background operation to the PMIC 1922. In some embodiments, the storage controller 1921 may transmit, to the volatile memory 1923 and/or the non-volatile memory 1924, a command for instructing that the background operation be performed. For example, in an idle state, the storage controller 1921 may transmit commands (a read command, a write command, etc.) to the non-volatile memory 1924 to perform a garbage collection operation.

In embodiments, the PMIC 1922 may set at least one power transistor to be activated, on the basis of the second power control signal, and generate at least one gate signal that toggles.

In embodiments, in an idle state, the PMIC 1922 may generate at least one gate signal that toggles, on the basis of the fourth power control signal.

Figure 20:
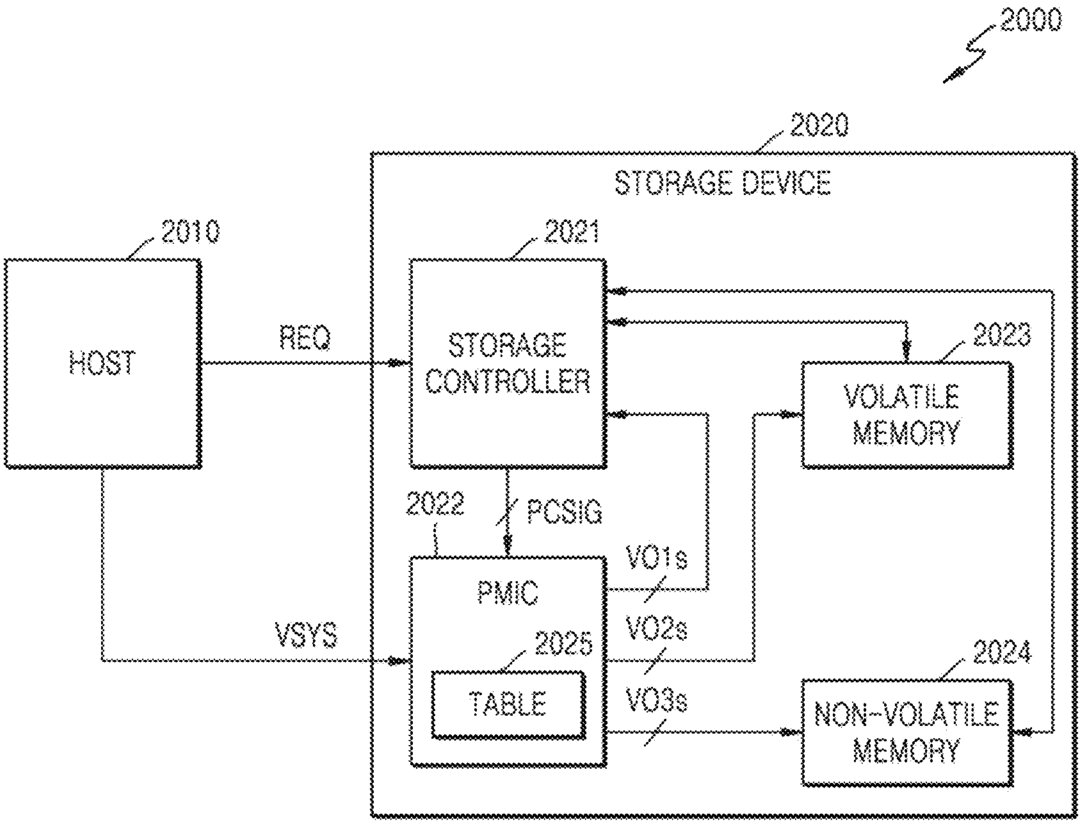

Referring to FIG. 20, the storage system 2000 may include a host 2010 and a storage device 2020. Repeated descriptions as those given above are omitted for conciseness.

In embodiments, a storage controller 2021 may correspond to the controller 220 of FIG. 2 and the controller 520 of FIG. 5. The storage controller 2021 may generate at least one power control signal PCSIG on the basis of the operation request REQ and the internal algorithm received from the host 2010. The power control signal PCSIG according to an embodiment may include an operation mode value, as described above with reference to FIG. 2. The storage controller 2021 may communicate with a PMIC 2022 via an interface.

In embodiments, a storage controller 2021 may correspond to the controller 1320 of FIG. 13 and the controller 1420 of FIG. 14. The storage controller 2021 may generate a power control signal PCSIG including the operation mode value on the basis of the operation request REQ and the internal algorithm received from the host 2010. The storage controller 2021 may be communicatively connected to the PMIC 2022 via at least one pin.

In embodiments, when the storage device 2020 is in an idle state, the storage controller 2021 may transmit, in the idle state, a third power control signal representing the background operation to the PMIC 2022. Also, the storage controller 2021 may transmit, to a volatile memory 2023 and/or a non-volatile memory 2024, a command for instructing that the background operation be performed.

In embodiments, the PMIC 2022 may store a table 2025. The table 2025 may include the first table of FIG. 3. The table 2025 may further include the second table of FIG. 4.

In embodiments, the PMIC 2022 may set at least one power transistor to be activated, on the basis of the first power control signal and the table 2025, and generate at least one gate signal that toggles.

In embodiments, in an idle state, the PMIC 2022 may generate at least one gate signal that toggles, on the basis of the third power control signal and the table 2025.

Figure 21:
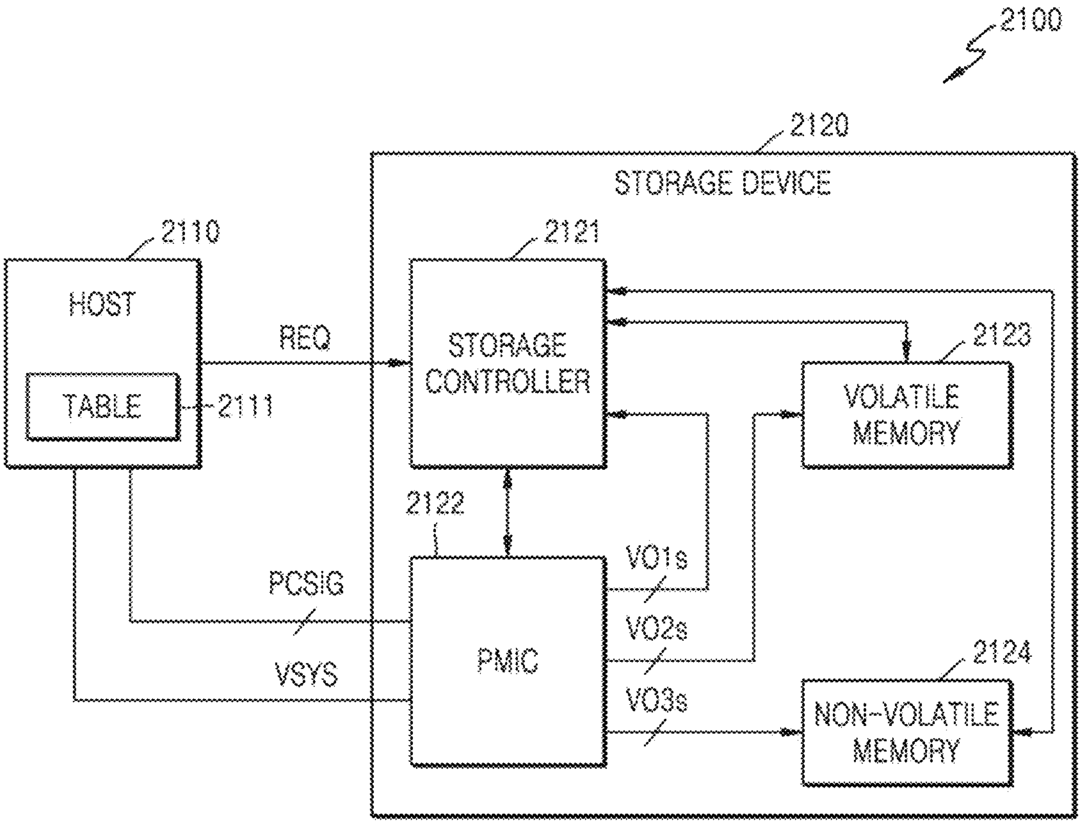

Referring to FIG. 21, the storage system 2100 may include a host 2110 and a storage device 2120. Repeated descriptions as those given above are omitted for conciseness.

In embodiments, the host 2110 may store a table 2111. The table 2111 may include the first table of FIG. 3. The table 2111 may further include the second table of FIG. 4.

In embodiments, the host 2110 may provide at least one power control signal PCSIG to a PMIC 2122 on the basis of an operation request REQ and the table 2111. The host 2110 may include the BMC 1720 of FIG. 17. In an embodiment, at least one power control signal PCSIG may include a first power control signal including the frequency of the gate signals and/or a second power control signal including the number of power transistors to be activated. The host 2110 and the PMIC 2122 may communicate with each other via an interface or may be communicatively connected to each other via at least one pin.

Although not shown in FIG. 21, according to some embodiments, the PMIC 2122 may store a table, such as the table 2111, the host 2110 may provide a power control signal PCSIG including an operation mode value to the PMIC 2122, and the PMIC 2122 may set the frequency of the gate signals and/or the number of power transistors on the basis of the operation mode value and the table.

According to the embodiments described above, the power consumption of the storage systems 1800, 1900, 2000, and 2100 may be reduced and optimized and the TCO of a user may be reduced.

Figure 22:
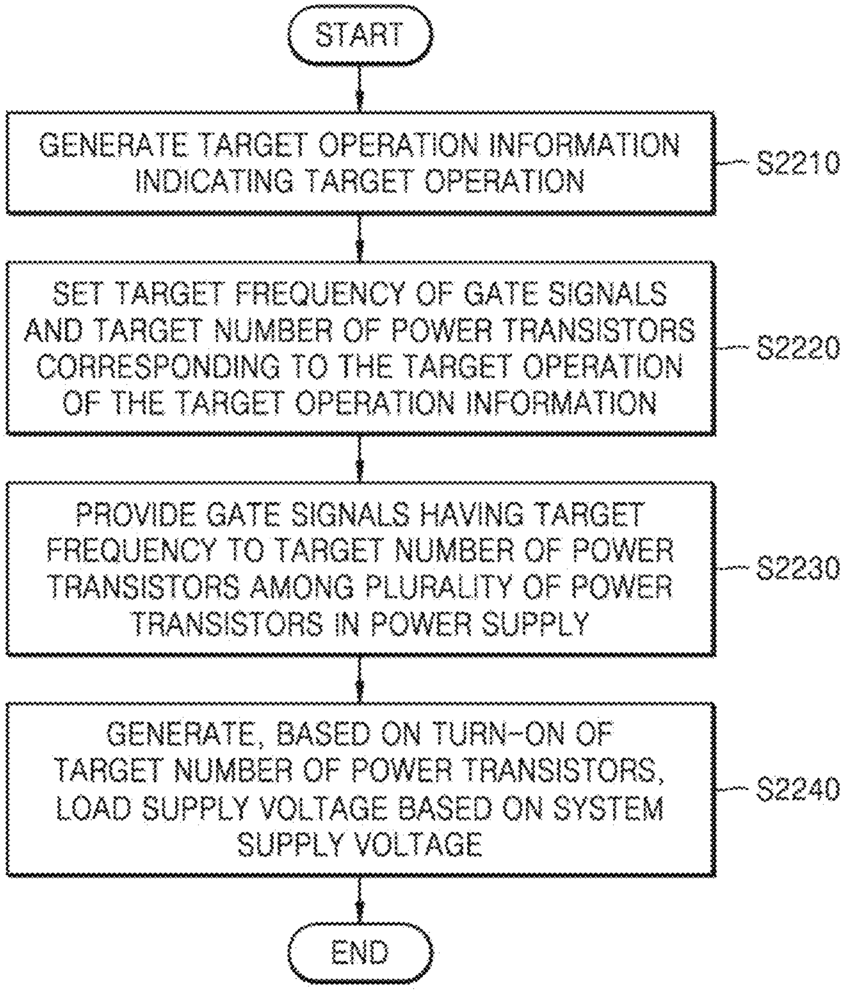
FIG. 22 is a flowchart illustrating a method of operating an electronic device, according to various embodiments.

FIG. 22 is a flowchart illustrating a method of operating an electronic device, according to some embodiments.

Referring to FIG. 22, operation S2210 is for generating target operation information indicating a target operation. Referring to FIG. 1, for example, the CPU 110 may generate the target operation information and transmit the target operation information to the controller 120.

Operation S2220 is for setting the target frequency and the target number corresponding to the target operation of the target operation information. For example, the target frequency and the target number may be set based on a table. The table may include, as described above, the frequency of the gate signals for each operation and the number of power transistors to be turned on. The target frequency may include the specific frequency of a gate signal. The target number may include the specific number of upper and lower power transistors to be activated.

Operation S2230 is for providing gate signals having the target frequency to the target number of power transistors among a plurality of power transistors in a power supply. For example, the upper and lower gate signals, which are input to the upper and lower power transistors to be activated, may toggle.

Operation S2240 is for generating, based on the turn-on of the target number of power transistors, a load supply voltage based on the system supply voltage.

In some embodiments, the table may include a first frequency group and a first number group corresponding to a plurality of foreground operations. The frequency group may include one or more values having the frequency of gate signals as a parameter. The number group may include one or more values having, as a parameter, the number of upper and lower power transistors.

In an embodiment, the foreground operations may include sequential read, sequential write, random read, and random write. The first frequency group may include a first frequency of the gate signals set for the random read, a second frequency of the gate signals set for the sequential read, a third frequency of the gate signals set for the random write, and a fourth frequency of the gate signals set for the sequential write. The first number group may include a first number of power transistors set for the random read, a second number of power transistors set for the sequential read, a third number of power transistors set for the random write, and a fourth number of power transistors for the sequential write.

In an embodiment, the first frequency may be the smallest and the fourth frequency may be the largest in the table. In the table, the first number may be the smallest and the fourth number may be the largest.

In embodiments, the table may further include a second frequency group and a second number group corresponding to a plurality of background operations.

In embodiments, the method of operating the electronic device may further include monitoring a load current corresponding to the load supply voltage and changing the target number of power transistors and the target frequency of the gate signals on the basis of the monitoring results. The embodiments described above are the same as those described above with reference to FIG. 7.

In an embodiment, the changing of the target number of power transistors and the target frequency of the gate signals on the basis of the monitoring results may include increasing the target number of power transistors and the target frequency of the gate signals on the basis of a first monitoring result in which an increasing first load current has been monitored, and decreasing the target number of power transistors and the target frequency of the gate signals on the basis of a second monitoring result in which a decreasing second load current has been monitored. The embodiments described above are the same as those described above with reference to FIG. 7.

While various embodiments have been particularly shown and described with reference to the drawings, it will be understood that various changes in form and details may be made therein without departing from the spirit and scope of the following claims.

What is claimed is:

1. An electronic device comprising:

a controller configured to:

store a table comprising gate signal frequencies and numbers of power transistors for a plurality of operations, and based on the table and an operation request to perform an operation, output a power control signal comprising at least one of a gate signal frequency for the operation or a number of power transistors for the operation; and a power supply comprising a plurality of power transistors that receive a plurality of gate signals, the power supply is configured to:

based on the power control signal, generate at least one gate signal that is input to at least one power transistor among the plurality of power transistors, and based on turn-on of the at least one power transistor, generate a load supply voltage based on a system supply voltage.

2. The electronic device of claim 1, wherein the power control signal comprises a first power control signal comprising the gate signal frequency and a second power control signal comprising the number of power transistors, and wherein the power supply comprises:

a plurality of upper power transistors, each comprising a gate configured to receive an upper gate signal, a first electrode connected to a first node to which a first supply voltage is received, and a second electrode connected to a second node;

a plurality of lower power transistors, each comprising a gate configured to receive a lower gate signal, a first electrode connected to a third node to which a second supply voltage is received, and a second electrode connected to the second node;

an on-timer configured to:

receive the first power control signal, based on the gate signal frequency indicated by the first power control signal, adjust a turn-on time indicating a period during which the plurality of gate signals maintain a turn-on level, and generate an on-time signal according to the turn-on time; and a power controller configured to:

receive at least one of the on-time signal or the second power control signal, in response to the second power control signal, based on the number of power transistors indicated by the second power control signal, output at least one upper gate signal and at least one lower gate signal that toggle between the turn-on level and a turn-off level, and in response to the on-time signal, based on the turn-on time, adjust frequencies of the at least one upper gate signal provided to the plurality of upper power transistors and the at least one lower gate signal provided to the plurality of lower power transistors.

3. The electronic device of claim 2, wherein the power supply further comprises:

a first current sensor configured to sense a first current flowing through the plurality of upper power transistors and configured to output a first current sensing signal comprising a value of the first current; and a second current sensor configured to sense a second current flowing through the plurality of lower power transistors and configured to output a second current sensing signal comprising a value of the second current, and wherein the power controller is configured to, based on the first current sensing signal and the second current sensing signal, change at least one of the frequencies of each of the at least one upper gate signal and the at least one lower gate signal that are toggled or a number of the plurality of upper power transistors and the plurality of lower power transistors.

4. The electronic device of claim 3, wherein the first current and the second current correspond to a load current that is output from the second node, and the power controller is configured to:

increase the frequencies of each of the at least one upper gate signal and the at least one lower gate signal that are toggled and the number of the plurality of upper power transistors and the plurality of lower power transistors when a value of the load current increases, and decrease the frequencies of each of the at least one upper gate signal and the at least one lower gate signal that are toggled and the number of the plurality of upper power transistors and the plurality of lower power transistors when the value of the load current decreases.

5. The electronic device of claim 1, wherein:

the plurality of operations comprise a sequential read, a sequential write, a random read, and a random write, and the table comprises a first gate signal frequency and a first number of power transistors for the random read, a second gate signal frequency and a second number of power transistors for the sequential read, a third gate signal frequency and a third number of power transistors for the random write, and a fourth gate signal frequency and a fourth number of power transistors for the sequential write.

6. The electronic device of claim 5, wherein the first gate signal frequency has a smallest value and the fourth gate signal frequency has a largest value in the table, and the first number of power transistors has a smallest value and the fourth number of power transistors has a largest value.

7. The electronic device of claim 1, wherein the controller is configured to transmit a first power control signal to the power supply via an interface in response to a first operation request received from outside, and the power supply is configured to transmit a first response signal with respect to the first power control signal to the controller via the interface.

8. The electronic device of claim 1, wherein the power supply further comprises a plurality of buck converters configured to convert the system supply voltage into a plurality of load supply voltages by controlling a turn-on operation of each of the plurality of power transistors according to the gate signal frequency and the number of power transistors and configured to output the plurality of load supply voltages via a plurality of channels.

9. An electronic device comprising:

a controller configured to:

receive an operation request to perform an operation, and output a power control signal indicating the operation in response to the operation request; and a power supply comprising a plurality of power transistors receiving a plurality of gate signals, the power supply configured to:

store a table comprising gate signal frequencies and numbers of power transistors for a plurality of operations, based on the power control signal and the table, generate at least one gate signal that is input to at least one power transistor among the plurality of power transistors, and based on turn-on of the at least one power transistor, generate a load supply voltage based on a system supply voltage.

10. The electronic device of claim 9, the power control signal comprises a first power control signal comprising a gate signal frequency in the table that corresponds to the operation and a second power control signal comprising a number of power transistors in the table that corresponds to the operation, and wherein the power supply further comprises:

a plurality of upper power transistors, each comprising a gate configured to receive an upper gate signal, a first electrode connected to a first node to which a first supply voltage is received, and a second electrode connected to a second node;

a plurality of lower power transistors, each comprising a gate configured to receive a lower gate signal, a first electrode connected to a third node to which a second supply voltage is received, and a second electrode connected to the second node;

an on-timer configured to:

receive the first power control signal, based on the gate signal frequency indicated by the first power control signal, adjust a turn-on time indicating a period during which the plurality of gate signals maintain a turn-on level, and generate an on-time signal comprising the turn-on time; and a power controller configured to:

receive at least one of the on-time signal or the second power control signal, in response to the second power control signal, based on the number of power transistors indicated by the second power control signal, output at least one upper gate signal and at least one lower gate signal that toggle between the turn-on level and a turn-off level, and in response to the on-time signal, based on the turn-on time, adjust frequencies of the at least one upper gate signal provided to the plurality of upper power transistors and the at least one lower gate signal provided to the plurality of lower power transistors.

11. The electronic device of claim 10, wherein the power supply further comprises:

a first current sensor configured to sense a first current flowing through the plurality of upper power transistors and configured to output a first current sensing signal comprising a value of the first current; and a second current sensor configured to sense a second current flowing through the plurality of lower power transistors and configured to output a second current sensing signal comprising a value of the second current, and wherein the power controller is configured to, based on the first current sensing signal and the second current sensing signal, change at least one of the frequencies of each of the at least one upper gate signal and the at least one lower gate signal that are toggled or a number of the plurality of upper power transistors and the plurality of lower power transistors.

12. The electronic device of claim 9, wherein:

the plurality of operations comprise a sequential read, a sequential write, a random read, and a random write, and the table comprises a first gate signal frequency and a first number of power transistors for the random read, a second gate signal frequency and a second number of power transistors for the sequential read, a third gate signal frequency and a third number of power transistors for the random write, and a fourth gate signal frequency and a fourth number of power transistors for the sequential write.

13. The electronic device of claim 12, wherein the first gate signal frequency has a smallest value and the fourth gate signal frequency has a largest value in the table, and the first number of power transistors has a smallest value and the fourth number of power transistors has a largest value.

14. The electronic device of claim 9, wherein the controller is configured to transmit a first power control signal indicating a first operation to the power supply via an interface in response to a first operation request requesting to perform the first operation, and the power supply is configured to transmit a first response signal with respect to the first power control signal to the controller via the interface.

15. The electronic device of claim 9, wherein the controller comprises at least one first pin for transmitting the power control signal, the power supply comprises at least one second pin connected to the at least one first pin and receiving the power control signal, and the controller is configured to generate a command to perform the operation, after transmitting the power control signal to the power supply.

16. A storage system comprising:

a host configured to:

store a table comprising gate signal frequencies and numbers of power transistors for each of a plurality of operations, generate an operation request to perform an operation, generate one of a first power control signal indicating the operation and a second power control signal comprising a gate signal frequency and a number of power transistors for the operation indicated by the first power control signal, and generate a system supply voltage; and a storage device configured to:

store the table, receive the operation request, one of the first power control signal or the second power control signal, and the system supply voltage, based on the one of the first power control signal or the second power control signal, control turn-on operations of a plurality of power transistors, based on the plurality of power transistors that are turned on, convert the system supply voltage into a load supply voltage, and perform the operation.

17. The storage system of claim 16, wherein the storage device receives the first power control signal, and wherein the storage device comprises:

a memory;

a storage controller configured to, based on the operation request, transmit to the memory a command to perform the operation; and a power management integrated circuit (PMIC) comprising the plurality of power transistors, the PMIC configured to:

based on the first power control signal and the table, generate at least one gate signal that is input to at least one power transistor among the plurality of power transistors, and based on turn-on of the at least one power transistor, generate the load supply voltage.

18. The storage system of claim 17, wherein the table comprises a plurality of first gate signal frequencies and a plurality of first numbers of power transistors for each of a plurality of foreground operations, and a plurality of second gate signal frequencies and a plurality of second numbers of power transistors for each of a plurality of background operations, wherein the storage controller in an idle state is configured to:

transmit, to the PMIC, a third power control signal indicating a background operation, and transmit, to the memory, a second command to perform the background operation, and wherein the PMIC is configured to, based on the third power control signal and the table, generate the at least one gate signal.

19. The storage system of claim 16, wherein the storage device receives the second power control signal, and wherein the storage device comprises:

a memory;

a storage controller configured to store the table and configured to, based on the operation request, transmit, to the memory, a first command to perform the operation; and a power management integrated circuit (PMIC) comprising the plurality of power transistors, the PMIC configured to:

based on the second power control signal, generate at least one gate signal that is input to at least one power transistor among the plurality of power transistors, and based on turn-on of the at least one power transistor, generate the load supply voltage.

20. The storage system of claim 19, wherein the table comprises a plurality of first gate signal frequencies and a plurality of first numbers of power transistors for each of a plurality of foreground operations, and a plurality of second gate signal frequencies and a plurality of second numbers of power transistors for each of a plurality of background operations, wherein the storage controller in an idle state is configured to:

transmit, to the PMIC, a fourth power control signal comprising a second gate signal frequency and a second number of power transistors for a background operation, and transmit, to the memory, a second command to perform the background operation, and wherein the PMIC in the idle state is configured to, based on the fourth power control signal, generate the at least one gate signal.

* * * * *